(12) United States Patent  
Ozeki et al.

(10) Patent No.: US 8,158,295 B2  
(45) Date of Patent: Apr. 17, 2012

(54) FUEL CELL SYSTEM

(75) Inventors: Masataka Ozeki, Osaka (JP); Hideo Ohara, Osaka (JP); Akinari Nakamura, Osaka (JP); Yoshikazu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/752,603

(22) Filed: Apr. 1, 2010

(65) Prior Publication Data  
US 2010/0190070 A1    Jul. 29, 2010

Related U.S. Application Data

(63) Continuation of application No. 11/666,314, filed as application No. PCT/JP2005/019730 on Oct. 26, 2005.

(30) Foreign Application Priority Data

Oct. 26, 2004    (JP) ................................. 2004-310296

(51) Int. Cl.  
*H01M 8/04* (2006.01)
(52) U.S. Cl. ........................................ 429/434; 429/428
(58) Field of Classification Search .................. 429/434  
See application file for complete search history.

(56) References Cited

U.S. PATENT DOCUMENTS

| 6,306,531 | B1 * | 10/2001 | Clingerman et al. | 429/416 |
| 2004/0079564 | A1 * | 4/2004 | Tabata | 180/65.2 |
| 2004/0081867 | A1 * | 4/2004 | Edlund | 429/22 |
| 2004/0102315 | A1 * | 5/2004 | Bailie et al. | 502/304 |

FOREIGN PATENT DOCUMENTS

| JP | 47-25782 | | 7/1972 |
| JP | 7-114935 | A | 5/1995 |
| JP | 9-320625 | A | 12/1997 |
| JP | 2001-176528 | | 6/2001 |
| JP | 2003-282116 | A | 10/2003 |
| JP | 2004-47438 | A | 2/2004 |
| JP | 2004-59337 | A | 2/2004 |
| JP | 2004-59354 | A | 2/2004 |

* cited by examiner

*Primary Examiner* — Patrick Ryan  
*Assistant Examiner* — Brent Thomas  
(74) *Attorney, Agent, or Firm* — McDermott Will & Emery LLP

(57) ABSTRACT

A fuel cell system of the present invention includes: a fuel cell configured to generate electric power using a fuel; a fuel processor configured to generate the fuel from a power generation material and supply the fuel to the fuel cell; composition-related information acquiring means (22) for acquiring composition-related information related to the composition of the power generation material; and control parameter setting means (111) for setting control parameters for the fuel cell system based on the acquired composition-related information, the control parameters being related to a composition of the power generation material.

52 Claims, 32 Drawing Sheets

Enter numerical values of average atomicities of carbon c and hydrogen h in the fields indicated by "?"

Average atomicity of C = ?

Average atomicity of H = ?

Fig. 3(a)

Enter numerical values of average atomicities of carbon c and hydrogen h in the fields indicated by "?"

Average atomicity of C = 1.2

Average atomicity of H = 4.4

Fig. 3(b)

| NAME OF SUPPLIER | MATERIAL COMPOSITION |
|---|---|
| A | $C_{1.2}H_{4.4}$ |
| B | $C_{1.166}H_{4.332}$ |
| C | ............ |
| ⋮ | ⋮ |

Fig. 5

| AREA NAME | MATERIAL COMPOSITION |
|---|---|
| TOKYO | $C_{1.2}H_{4.4}$ |
| OSAKA | $C_{1.166}H_{4.332}$ |
| □□ | ·········· |
| ⋮ | ⋮ |

Fig. 7

| AREA CODE | MATERIAL COMPOSITION |
|---|---|
| 03 | $C_{1.2}H_{4.4}$ |
| ⋮ | ⋮ |
| 06 | $C_{1.166}H_{4.332}$ |
| ⋮ | ⋮ |

| GAS TYPE | TIME INFORMATION | COMPONENT (vol.%) | | | | | |
|---|---|---|---|---|---|---|---|
| | | HYDROGEN $H_2$ | METHANE $CH_4$ | PROPANE $C_3H_8$ | BUTANE $C_4H_{10}$ | NITROGEN $N_2$ | AIR $O_2$ 21% $N_2$ 79% |
| 13A | Ta | – | 83 | 17 | – | – | – |
| | Tb | 29 | 58 | 13 | – | – | – |
| | Tc | – | 95 | – | – | 5 | – |
| 6A | Ta | 47 | – | – | 28 | – | 72 |
| | Tb | – | – | – | 26 | 13 | 61 |
| LI | Ta | 47 | – | 20 | – | 33 | – |
| | Tb | 64 | – | 11 | – | 25 | – |
| | Tc | 35 | – | 19 | – | 46 | – |
| 5C | Ta | 39 | 17 | 7 | – | 37 | – |
| | Tb | 55 | – | 11 | – | 34 | – |
| | Tc | 37 | – | 14 | – | 49 | – |
| L2 | Ta | 23 | – | 21 | – | 56 | – |
| | Tb | 41 | – | 11 | – | 48 | – |
| | Tc | – | 45 | – | – | 3 | 52 |
| LIQUEFIED PETROLEUM GAS | Ta | – | – | 90 | 10 | – | – |
| | Tb | – | – | 25 | 75 | – | – |

| GAS TYPE | MATERIAL COMPOSITION |
|---|---|
| 13A | $C_{n1}H_{m1}$ |
| 12A | $C_{n2}H_{m2}$ |
| L1 | $C_{n3}H_{m3}$ |
| ⋮ | ⋮ |

Fig. 17

| TIME INFORMATION | MATERIAL COMPOSITION |
|---|---|
| Ta | $C_{n1}H_{m1}$ |
| Tb | $C_{n2}H_{m2}$ |
| Tc | $C_{n3}H_{m3}$ |

Fig. 19

| NAME OF SUPPLIER | CONTROL PARAMETER $\beta$ | CONTROL PARAMETER $\gamma$ | CONTROL PARAMETER $\delta$ |
|---|---|---|---|
| A | $\beta_1$ | $\gamma_1$ | $\delta_1$ |
| B | $\beta_2$ | $\gamma_2$ | $\delta_2$ |
| C | $\beta_3$ | $\gamma_3$ | $\delta_3$ |
| ⋮ | ⋮ | ⋮ | ⋮ |

Fig. 21

| AREA NAME | CONTROL PARAMETER $\beta$ | CONTROL PARAMETER $\gamma$ | CONTROL PARAMETER $\delta$ |
|---|---|---|---|
| TOKYO | $\beta_1$ | $\gamma_1$ | $\delta_1$ |
| OSAKA | $\beta_2$ | $\gamma_2$ | $\delta_2$ |
| □□ | $\beta_3$ | $\gamma_3$ | $\delta_3$ |
| ⋮ | ⋮ | ⋮ | ⋮ |

Fig. 23

| GAS TYPE | CONTROL PARAMETER $\beta$ | CONTROL PARAMETER $\gamma$ | CONTROL PARAMETER $\delta$ |
|---|---|---|---|
| 13A | $\beta_1$ | $\gamma_1$ | $\delta_1$ |
| 12A | $\beta_2$ | $\gamma_2$ | $\delta_2$ |
| L1 | $\beta_3$ | $\gamma_3$ | $\delta_3$ |
| ⋮ | ⋮ | ⋮ | ⋮ |

Fig. 25

| TIME INFORMATION | CONTROL PARAMETER $\beta$ | CONTROL PARAMETER $\gamma$ | CONTROL PARAMETER $\delta$ |
|---|---|---|---|
| Ta | $\beta_1$ | $\gamma_1$ | $\delta_1$ |
| Tb | $\beta_2$ | $\gamma_2$ | $\delta_2$ |
| Tc | $\beta_3$ | $\gamma_3$ | $\delta_3$ |

Fig. 27

| AREA CODE | CONTROL PARAMETER $\beta$ | CONTROL PARAMETER $\gamma$ | CONTROL PARAMETER $\delta$ |
|---|---|---|---|
| 03 | $\beta_1$ | $\gamma_1$ | $\delta_1$ |
| ⋮ | ⋮ | ⋮ | ⋮ |
| 06 | $\beta_n$ | $\gamma_n$ | $\delta_n$ |
| ⋮ | ⋮ | ⋮ | ⋮ |

Fig. 31

FUEL CELL SYSTEM

RELATED APPLICATIONS

This application is a Continuation of U.S. patent application Ser. No. 11/666,314, filed on Jan. 23, 2008, which is a U.S. National Phase under 35 U.S.C. §371 of International Application No. PCT/JP2005/019730, filed on Oct. 26, 2005, which in turn claims the benefit of Japanese Application No. 2004-310296, filed on Oct. 26, 2004, the entire contents of each of which are hereby incorporated by reference.

TECHNICAL FIELD

The present invention relates to fuel cell system, and more particularly to a fuel cell system in which setting of a control parameter of the fuel cell system related to the composition of a power generation material is changeable.

BACKGROUND ART

A fuel cell system is configured to generate electricity by supplying a fuel and an oxidizing agent (commonly air) to the anode and the cathode of a fuel cell and causing the fuel and the oxidizing agent to undergo a chemical reaction at the anode and the cathode. Hydrogen is commonly used as the fuel for the fuel cell, but the infrastructure for supplying hydrogen has not been publicly available. For this reason, conventional fuel cell system generally is provided with a fuel processor. This fuel processor generates a hydrogen rich gas by reforming a natural gas (hereinafter referred to as a material), for which the infrastructure has been available, using steam obtained by evaporating water. The resultant hydrogen rich gas is supplied to the fuel cell as the fuel (see, for example, Patent Reference 1).

Patent Reference 1: Japanese Unexamined Patent Publication No. 2001-176528

DISCLOSURE OF THE INVENTION

Problems the Invention is to Solve

The fuel cell system consumes the fuel according to the amount of electricity (electric power, more precisely electric current) generated. Therefore, the fuel is supplied to the fuel cell according to its output power. Otherwise, if the fuel is supplied excessively relative to the output power, the amount of excessive fuel (off gas) that is not consumed and is discharged from the fuel cell becomes large, lowering energy efficiency, while if the supply of the fuel is insufficient relative to the output power, a polarity inversion may occur in the fuel cell, causing damages to the electrodes.

Moreover, in the fuel cell system provided with a fuel processor, a material and water are supplied to the fuel processor so that they are mixed at a predetermined ratio (to be a predetermined S/C ratio). This is because if the amount of water is insufficient, carbon deposits on the surface of the reforming catalyst, deteriorating the performance. Conversely, if the amount of water is too large, extra heat is necessary to cause the water to evaporate, lowering the energy efficiency.

What corresponds to the output power is the amount of hydrogen, and a material and water are mixed so that the hydrogen atoms and the carbon atoms contained therein will be a predetermined ratio of the numbers. Therefore, the supply of the fuel (hereinafter referred to as "fuel supply control") and the mixing of the material and water (hereinafter referred to as S/C control) are carried out according to the composition of hydrogen and carbon contained in the material.

However, the composition of the material (natural gas) is different from one supply area to another, depending on the supplier of the material. The above-mentioned conventional fuel cell system carries out the supply of the fuel and the mixing of the material and water according to the composition of the material of a specific material supply area. In other words, the conventional fuel cell system is configured to be a dedicated system to each material supply area. Consequently, there has been a problem that when the user moves to a different material supply area, the user cannot relocate and use the fuel cell system that was installed at the original residence.

The present invention has been accomplished to resolve such a problem, and it is an object of the invention to provide a fuel cell system that can be used even in different material supply areas.

Means to Solve the Problems

In order to accomplish the foregoing object, a fuel cell system according to comprises: a fuel cell configured to generate electric power using a fuel; a fuel processor configured to generate the fuel from a power generation material and to supply the fuel to the fuel cell; composition-related information acquiring means configured to acquire composition-related information related to the composition of the power generation material; and control parameter setting means configured to set control parameters for the fuel cell system that are related to the composition of the power generation material based on the acquired composition-related information. In this configuration, the composition-related information is acquired, and control parameters related to the composition of the power generation material are set. Therefore, power generation can be carried out based on the thus-set control parameters. As a result, the fuel cell system can be used in different material supply areas.

The control parameter setting means may identify and set the control parameters based on the composition-related information and a correspondence of the composition-related information to the control parameters. This configuration makes it possible to set the control parameters automatically even if the composition-related information does not directly represent the composition of the power generation material.

The composition-related information may be information related to power generation material suppliers, and the correspondence of the composition-related information to the control parameters may be a correspondence between the power generation material suppliers and the control parameters. This configuration makes it possible to set the control parameters automatically by feeding the information related to the power generation material suppliers to the fuel cell system.

The composition-related information may be location information, and the correspondence of the composition-related information to the control parameters may be a correspondence between the control parameters and material supply areas of the power generation material that are the location information. This configuration makes it possible to set the control parameters automatically by feeding the location information to the fuel cell system.

The location information may be telephone numbers containing at least area codes, and the correspondence of the composition-related information to the control parameters may be a correspondence between the control parameters and the telephone numbers in the supply areas of the power generation material. This configuration makes it possible to set the control parameters automatically by feeding the area codes to the fuel cell system.

The composition-related information may be information related to types of the power generation material, and the correspondence of the composition-related information to the control parameters may be a correspondence between the types of the power generation material and the control parameters.

The composition-related information may be time information, and the correspondence of the composition-related information to the control parameters may be a correspondence between the time information and the control parameters.

The composition-related information may be ratios of at least carbon atoms and hydrogen atoms among the atoms that constitute the power generation material.

The composition-related information may be an average molecular formula containing a mole number of carbon atoms and a mole number of hydrogen atoms that are contained in 1 mole of the power generation material. With this configuration, the composition of a power generation material that contains a plurality of substances can be expressed accurately, and as a result, power generation can be carried out desirably based on the control parameters set accordingly.

The composition-related information acquiring means may be an information input device configured to input the composition-related information into the fuel cell system. This configuration makes it possible to set the control parameters manually.

The composition-related information acquiring means may be a communication device configured to perform data communication through an external communication system that transmits the composition-related information.

The control parameter setting means may set a control parameter related to a water supply amount to the fuel processor based on the composition-related information acquired by the composition-related information acquiring means.

The control parameter may be a ratio of the amount of water supplied to the fuel processor to an amount of the power generation material supplied to the fuel processor.

The control parameter setting means may set the control parameters such that the number of water molecules in the water supplied to the fuel processor is 2 or more per one carbon atom in the power generation material supplied to the fuel processor. This configuration makes it possible to suitably control the S/C ratio in generating the fuel based on a set control parameter (later-described $\beta$).

The control parameter setting means may set a control parameter for calculating an amount of hydrogen in the fuel supplied to the fuel processor based on the composition-related information acquired by the composition-related information acquiring means.

The fuel cell system may control an amount of power generation such that an amount of hydrogen consumed by the fuel cell becomes equal to or less than the amount of hydrogen in the fuel calculated based on the control parameters set by the control parameter setting means. This configuration makes it possible to carry out power generation while preventing polarity inversion in the fuel cell, using a set control parameter (later-described $\delta$).

The fuel cell system may control the supply amount of the power generation material and a supply amount of the water such that an amount of hydrogen in the fuel calculated based on the control parameter set by the control parameter setting means becomes equal to or greater than the amount of hydrogen consumed by the fuel cell.

The fuel cell system may further comprise a combustor to which a remaining fuel that has not been consumed by the fuel cell is supplied, and a combustion air supply device configured to supply air to the combustor, and the control parameter setting means may set a control parameter related to a supply amount of air to the combustor.

The control parameter setting means may set the control parameters such that a ratio of a supply amount of combustion air to a theoretical air amount necessary for completely combusting a combustible gas in the remaining fuel discharged from the fuel cell becomes 1 or greater. This configuration makes it possible to completely combust the hydrogen and hydrocarbon in the remaining fuel in the combustor based on the set control parameter (later-described $\gamma$).

The foregoing and other objects, features and advantages of the present invention will become more readily apparent from the following detailed description of preferred embodiments of the invention, with reference to the accompanying drawings.

Advantageous Effects of the Invention

The present invention has the above-described configurations and exhibits the advantageous effect that the fuel cell system can be used in different material supply areas.

BRIEF DESCRIPTION OF THE DRAWINGS

FIGS. 3(a) and 3(b) are views illustrating material composition input pictures that are displayed on a display device 23 of a control apparatus 9, wherein FIG. 3(a) is a view illustrating a picture before a material composition is entered and FIG. 3(b) is a view illustrating a picture after the material composition has been entered.

FIG. 5 is a table showing the relationship between suppliers of materials and the compositions of the materials.

FIG. 7 is a table showing the relationship between supply areas of materials and the compositions of the materials.

FIG. 13 is a schematic diagram illustrating a material composition identification table stored in a data storage device of a control apparatus of the fuel cell system shown in FIG. 12.

FIG. 16 is a table illustrating types of gases supplied by a fictitious gas supplier.

FIG. 17 is a table showing the relationship between types of gases and the compositions of the materials.

FIG. 19 is a table showing the relationship between time information and the compositions of materials.

FIG. 21 is a table, which illustrates the relationship between suppliers of materials and control parameters, used in a fuel cell system according to Embodiment 5 of the present invention.

FIG. 23 is a table, which illustrates the relationship between material supply areas and control parameters, used in a fuel cell system according to Embodiment 6 of the present invention.

FIG. 25 is a table showing the relationship between types of gases and control parameters.

FIG. 27 is a table showing the relationship between time information and control parameters.

FIG. 31 is a schematic view showing a control parameter setting table used in a fuel cell system according to Embodiment 10 of the present invention.

Figure 1:
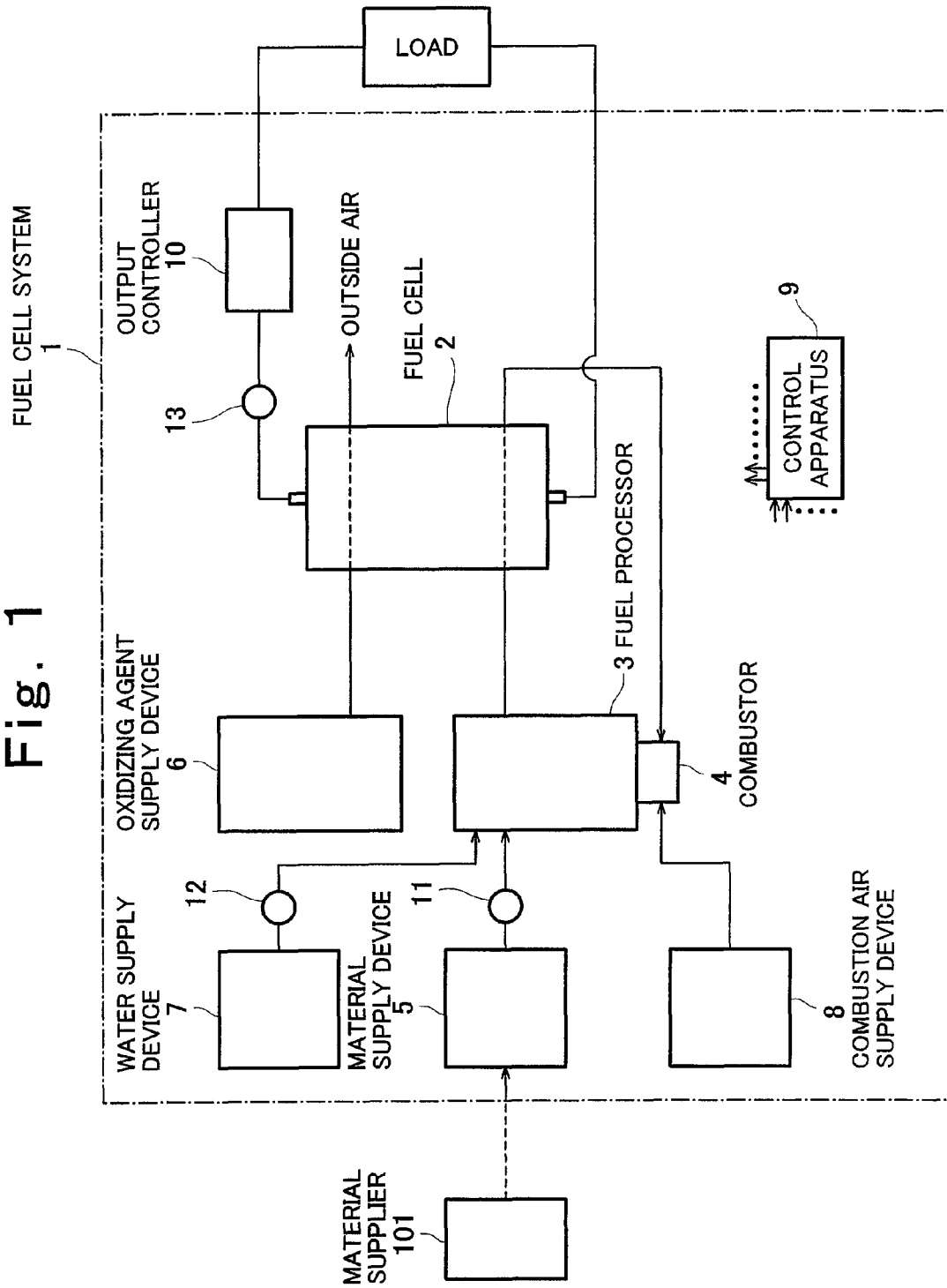
FIG. 1 is a block diagram schematically illustrating the configuration of a fuel cell system according to Embodiment 1 of the present invention.

BRIEF DESCRIPTION OF THE REFERENCE NUMERALS 1 fuel cell system
2 fuel cell
3 fuel processor
4 combustor
5 material supply device
6 oxidizing agent supply device
7 water supply device
8 combustion air supply device
9 control apparatus
10 output controller
11 material supply amount detecting means
12 water supply amount detecting means
13 generated current detecting means
16 wireless communication device
17 telephone set
18 terminal device
20 computing device
21 data storage device
22 information input device
23 display device
31 material composition input picture
101 material supplier

BEST MODE FOR CARRYING OUT THE INVENTION

Hereinbelow, preferred embodiments of the present invention are described with reference to the drawings.

A feature of the present invention is to set later-described control parameters based on later-described composition-related information. In this case, it is possible to set the control parameters in a manner such that a material composition is identified based on composition-related information and then the control parameters are set based on the identified material composition, in other words, the control parameters may be set indirectly based on the composition-related information, or the control parameters may be set directly based on the composition-related information.

Hereinbelow, Embodiments 1 to 4 illustrate embodiments in which the control parameters are set indirectly based on composition-related information, and Embodiments 5 to 11 illustrate embodiments in which the control parameters are set directly based on composition-related information.

Embodiment 1

FIG. 1 is a block diagram schematically illustrating the configuration of a fuel cell system according to Embodiment 1 of the present invention.

First, the configuration of the hardware will be described.

As illustrated in FIG. 1, a fuel cell system 1 of the present embodiment comprises a material supply means 5. The material supply means 5 comprises a main cock and a flow rate regulating valve or a booster, installed for a feed gas pipe, which is an infrastructure for a feed gas of a material supplier 101 (for example, a gas company). Herein, the feed gas is a natural gas. The fuel cell system 1 also comprises a water supply device 7. The water supply device 7 comprises a plunger pump, for example. A material and water are supplied from the material supply means 5 and the water supply means 7, respectively, to the fuel processor 3. The fuel processor 3 generates a hydrogen rich gas (hereinafter referred to as a fuel) from the supplied material and the steam generated from the water by a reforming reaction. The fuel generated by the fuel processor is supplied to the anode of the fuel cell. The fuel cell system 1 also comprises an oxidizing agent supply device 6. The oxidizing agent is air herein, and the oxidizing agent supply device 6 here comprises a blower. An oxidizing agent is supplied from the oxidizing agent supply device 6 to the cathode of the fuel cell 2. The fuel cell 2 is constituted by a known fuel cell, so the detailed description thereof will be omitted. The fuel and the oxidizing agent supplied respectively to the anode and the cathode of the fuel cell 2 undergo chemical reactions at the anode and the cathode, respectively, to generate electricity. The electricity generated by the fuel cell 2 is supplied to a load through an output controller 10.

The output controller 10 has an inverter, and converts the DC electricity input from the fuel cell 2 into AC electricity. The output controller 10 is interconnected with a commercial power network and controls the output power, i.e., the amount of the electricity generated by the fuel cell 2. The oxidizing agent that has not undergone a chemical reaction at the cathode of the fuel cell 2, which has not been consumed for power generation, is discharged from the fuel cell 2 to the outside air. The fuel that has not undergone a chemical reaction at the anode of the fuel cell 2, which has not been used for power generation, (the fuel being hereinafter referred to as an "off gas") is discharged from the fuel cell 2 and is supplied to a combustor 4. The combustor 4 herein comprises a burner. Combustion air is supplied from a combustion air supply device 8 to the combustor 4. The off gas supplied from the fuel cell 2 is mixed with the combustion air in the burner and is combusted. Then, the fuel processor 3 is heated by this combustion gas. By this heating, the fuel processor 3 receives the heat that is necessary for the above-mentioned reforming reaction and the evaporation of water. The combustion air supply device 8 herein comprises a sirocco fan.

Next, the configuration of the control system is described.

The fuel cell system 1 has a control apparatus 9. A material supply amount detecting means 11 for detecting the supply amount of the material is provided in a material supply path from the material supply means 5 to the fuel processor 3, and the detection output is input to the control apparatus 9. Likewise, a water supply amount detecting means 12 for detecting the supply amount of water is provided in a water supply path from the water supply means 7 to the fuel processor 3, and the detection output is input to the control apparatus 9. The material supply amount detecting means 11 and the water supply amount detection means 12 are respectively constituted by flow rate meters such as mass flow meters. Further, a generated current detecting means 13 is provided in an electric current supply path from an output terminal of the fuel cell 2 to the output controller 10, and the detection output is also input to the control apparatus 9. The generated current detecting means 13 herein is constituted by an electric current meter. The control apparatus 9 controls the overall operations of the fuel cell system 1 by receiving various detection outputs including the above-described detection outputs and controlling the above-described various elements. The control apparatus 9 also performs later-described setting of the composition of power generation materials.

Next, the control apparatus 9 is described in detail.

Figure 2:
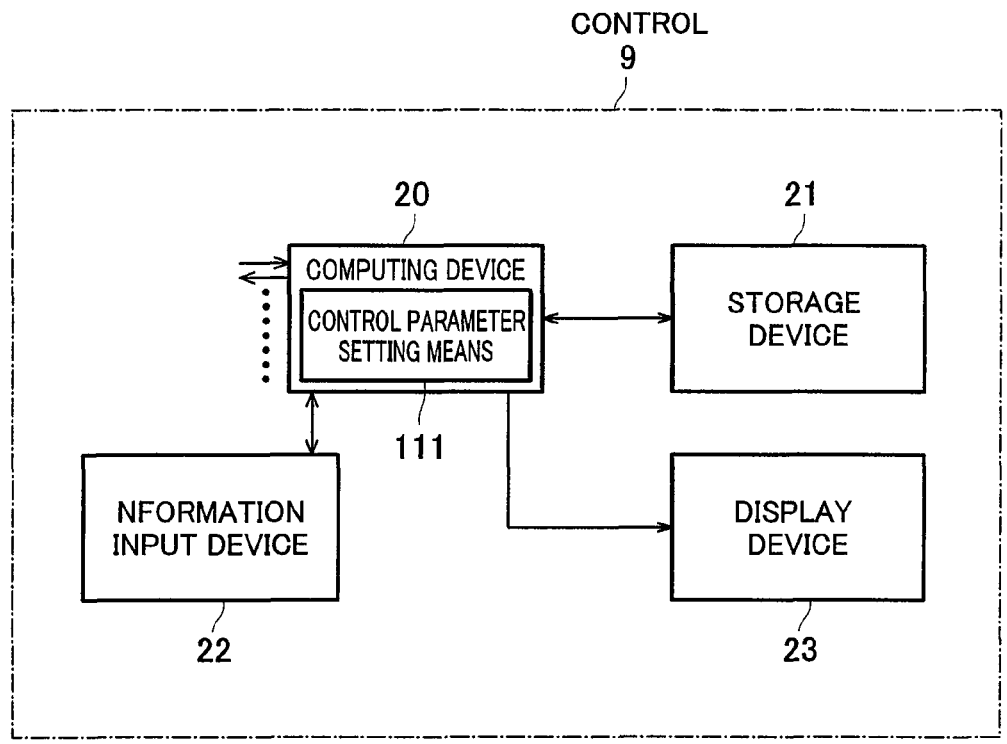
FIG. 2 is a block diagram schematically illustrating the configuration of a control apparatus of the fuel cell system shown in FIG. 1.

FIG. 2 is a block diagram schematically illustrating the configuration of a control apparatus of the fuel cell system shown in FIG. 1.

As illustrated in FIG. 2, the control apparatus 9 comprises a computing device 20, a data storage device 21, an information input device 22, and a display device 23.

The control apparatus 9 herein comprises a microcomputer and peripherals. The computing device 20 is constituted by a CPU of the microcomputer, and the data storage device 21 is constituted by internal memories (RAM and ROM) of the microcomputer. The detection outputs from the material supply amount detecting means 11, the water supply amount detection means 12, and the generated current detecting means 13 are input to the computing device 20. In addition, the required quantity of state of the fuel cell system 1 is detected and input to the computing device 20. The data storage device 21 stores programs for controlling various operations of the fuel cell system 1, and the computing device 20 reads out a necessary program from the data storage device 21 and executes the program to thereby control various operations of the fuel cell system 1. This control is carried out by executing a necessary process based on the foregoing detected quantities of state, and outputting a necessary control signal based on the process. The computing device 20 sets required control parameters for the fuel cell system 1 and thereby functions as a control parameter setting means 111.

The information input device 22 comprises a known information input device such as a keyboard and a mouse. It converts information into data signals and inputs the signals into the computing device 20. The display device 23 comprises a display unit such as a liquid crystal display panel and performs display operations in response to display signals that are output from the computing device 20.

In the present specification, the "control apparatus" is meant to include not only a single control apparatus but also a control apparatus group in which a plurality of control apparatus execute control operations in cooperation with one another. Therefore, the control apparatus 9 does not need to be constituted by a single control apparatus but may be constituted by a plurality of distributed control apparatus arranged to control the operations of the fuel cell system 1 in cooperation with one another.

Next, the characteristic features of the control apparatus 9 in the present invention are described.

FIGS. 3(a) and 3(b) are views illustrating material composition input pictures that are displayed on the display device 23 of the control apparatus 9, wherein FIG. 3(a) is a view illustrating a picture before a material composition is entered and FIG. 3(b) is a view illustrating a picture after the material composition has been entered.

As shown in FIG. 3(a), a message "Enter the numerical values of average atomicities of carbon (C) and hydrogen (H) into the fields indicated by '?'." is displayed on a material composition input picture 31, and the input fields for the numerical values of the average atomicities of C and H are indicated by the symbol "?".

The user operates the information input device 22 to enter the numerical values of the average atomicities of C and H into the fields indicated by "?", as shown in FIG. 3(b). Then, when the user carries out a determination operation such as pressing "enter," the numerical values of the average atomicities of C and H are stored in the data storage device 21 by the computing device 20.

It should be noted that the term "average atomicity" refers to the number of mole of C or H contained in 1 mol of the material. The material composition is defined by an average molecular formula (e.g., $C_{1.2}H_{4.4}$) using the average atomicities of C and H so that the differences in the compositions can be identified.

In the present embodiment, the composition of the material is represented by an average molecular formula defined based on the contents of the molecules contained in 1 mole of the material. The reason why the material composition is represented by an average molecular formula is that a natural gas contains a plurality of types of hydrocarbon-based substances and that the fuel supply control and the S/C control are carried out based on the average atomicity of hydrogen and the average atomicity of carbon in the average molecular formula.

It should be noted that the material composition input picture 31 shown in FIG. 3(a) may be configured so that an average molecular formula represented by average atomicities of C and H (e.g., $C_{1.2}H_{4.4}$) can be input directly as the material composition.

The material represented by the average molecular formula $C_{1.2}H_{4.4}$, which is shown as an example in FIG. 3(b), is the composition of the material in the material supply area of Tokyo.

The molecular formula that is entered using the foregoing material composition input picture 31 is the information that directly represents the "material composition." In the present invention, such information that directly represents the "material composition" and the information that is related to the "material composition" and is used for identifying the material composition are collectively referred to as composition-related information.

A material composition setting program (which will be discussed later) including the display of this material composition input picture 31 is stored in the data storage device 21, and the computing device 20 reads out this material composition setting program from the data storage device 21 to carry out the setting of the material composition.

Next, the operations of the fuel cell system 1 configured as described above are discussed below. The operations of this fuel cell system 1 are accomplished by the control executed by the computing device 20 of the control apparatus 9.

First, a material composition setting operation will be described.

Figure 4:
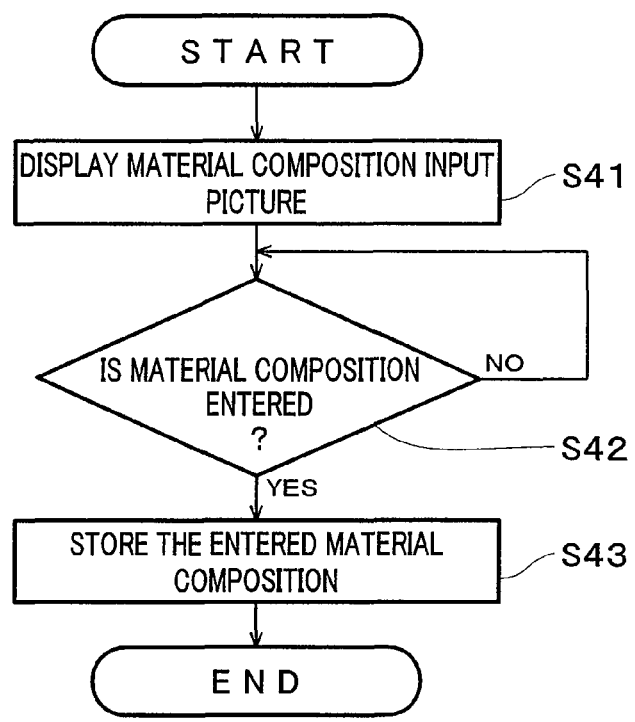
FIG. 4 is a flowchart illustrating a material composition setting program, which characterizes the present invention.

FIG. 4 is a flowchart illustrating a material composition setting program, which characterizes the present invention.

Referring to FIGS. 1 through 4, first, the user operates an operation portion (not shown) of the fuel cell system 1 to switch the fuel cell system 1 to the material composition setting mode. This operation is executed by the control from the computing device 20 of the control apparatus 9.

Then, the computing device 20 of the control apparatus 9 displays the material composition input picture 31 shown in FIG. 3(a) on the display device 23 (step S41).

Then, the computing device 20 waits for an input of the material composition (step S42). When the user operates the information input device 22 to enter the numerical values of the average atomicities of C and H into the fields indicated by "?", as shown in FIG. 3(b), and carries out a determination operation such as pressing "enter," the numerical values of the average atomicities of C and H are entered into the computing device 20.

Then, the computing device 20 makes the data storage device 21 store the average molecular formula (herein, $C_{1.2}H_{4.4}$, as described above) specified by the input numerical values of the average atomicities of C and H as the material composition (step S43).

Thus, the material composition setting is completed.

It should be noted that when a material composition has been stored as a default value in the production stage, the entered "material composition" overwrites the currently stored "material composition" when stored.

Next, the operations of the fuel cell system that are related to the material composition are discussed below. It is assumed herein that the fuel cell system 1 is installed within a material supply area in Tokyo, and "$C_{1.2}H_{4.4}$" is set as the "material composition."

When the fuel cell system 2 is under a power generation operation, the computing device 20 computes and sets a control parameter β, which is related to the water supply amount to the fuel processor 3, a control parameter γ, which is related to the air supply amount to the combustor 4, and a control parameter δ, which is for calculating the hydrogen in the fuel to be supplied to the fuel cell 2 (to store the parameters in the data storage device 21). Then, the computing device 20 controls the fuel cell system 2 so as to perform power generation based on these control parameters β, γ, and δ.

First, a material is supplied from the material supply means 5 to the fuel processor 3, and water is supplied from the water supply device 7 to the fuel processor 3. The fuel processor 3 generates a fuel that contains hydrogen abundantly from the supplied material and water through a reforming reaction. Here, since the fuel cell system 1 is installed in the material supply area "Tokyo," this reforming reaction is represented by the following formula.

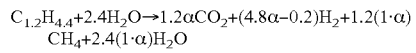

$$C_{1.2}H_{4.4}+2.4H_2O \rightarrow 1.2\alpha CO_2+(4.8\alpha-0.2)H_2+1.2(1-\alpha)CH_4+2.4(1-\alpha)H_2O$$

[α: Conversion Rate of the Fuel Processor 3]

At this time, the computing device 20 of the control apparatus 9 reads out the material composition "$C_{1.2}H_{4.4}$" from the data storage device 21, and controls the S/C ratio in the supply of the material and water based on this material composition. Specifically, the computing device 20 computes, from the material composition "$C_{1.2}H_{4.4}$", an appropriate control parameter β so that the number of water molecules in the material becomes two or more per one carbon atom in the material. This control parameter β is a ratio of water supply amount to material supply amount. The control parameter β herein is 2.4. Then, each of the material supply means 5 and the water supply device 7 is controlled so that the ratio of the water supply amount to the material supply amount detected by the material supply amount detecting means 11 results in this control parameter β value. This prevents the deterioration of the reforming catalyst due to carbon deposition.

Meanwhile, the fuel generated by the fuel processor 3 is supplied to the fuel cell 2. The fuel cell 2 generates electric power by a chemical reaction between the supplied fuel and the oxidizing agent supplied from the oxidizing agent supply device 6. At this time, the computing device 20 computes the amount of hydrogen in the fuel generated by the fuel processor 3 based on the material supply amount and the foregoing reaction formula. Specifically, the computing device 20 computes the coefficient of the hydrogen $H_2$ (4.8α−0.2) in the foregoing reaction formula, and sets (stores in the data storage device 21) the result as a control parameter δ. Then, using the control parameter δ, the computing device 20 computes the amount of hydrogen in the fuel generated by the fuel processor 3 from the material supply amount.

The computing device 20 also calculates the amount of hydrogen consumed by the fuel cell 2 from the generated current detected by the generated current detecting means 13.

Then, the control apparatus 20 performs necessary control for power generation by the fuel cell 2 based on the calculated hydrogen amount in the fuel and the hydrogen amount consumed in the fuel cell 2.

Specifically, when the supply of the fuel is limited, for example, as in starting up the apparatus, the computing device 20 controls the generated current by controlling the output controller 10 so that the amount of hydrogen consumed by the fuel cell 2 is less than the calculated amount of hydrogen in the fuel. In addition, when the generated current cannot be adjusted as in the case of outputting the maximum electric power, the computing device 20 controls the material supply means 5 and the water supply device 7 so that the calculated amount of hydrogen in the fuel is greater than the amount of hydrogen consumed by the fuel cell 2. This prevents polarity inversion.

Also, the fuel that was not consumed by the fuel cell 2 is mixed with combustion air supplied from the combustion air supply device 8, and is combusted in the combustor 4. By the combustion gas, the fuel processor 3 is supplied with the heat that is necessary for the reforming reaction.

At this time, the computing device 20 calculates the amounts of hydrogen and methane in the fuel generated by the fuel processor 3 based on the supply amount of the material and the foregoing reaction formula, and further, using the amounts of hydrogen and methane thus calculated, the computing device 20 subtracts the amount of hydrogen consumed by the fuel cell 2, which has been calculated in the foregoing manner, to calculate the amounts of hydrogen and methane (the amount of combustible gas) in the off gas that is supplied to the combustor 4. Then, the computing device 20 calculates the amount of combustion air (theoretical air amount) that is theoretically necessary for combusting the thus-calculated amount of combustible gas thus calculated, and the computing device 20 sets a control parameter γ related to the combustion air supply amount (i.e., makes the data storage device 21 store the parameter) so that an air ratio (λ), which is the actual air supply amount with respect to the theoretical air amount, becomes a predetermined value that is equal to or greater than 1. Then, based on the control parameter γ, the control apparatus 20 controls the combustion air supply device 8 so as to supply the combustion air to the combustor 4 in an amount corresponding to the supply amount of the combustible gas. Thereby, the off gas can be completely combusted in the combustor 4.

Next, the relationship of material composition with control parameter β, control parameter δ, and control parameter γ is discussed in detail. The foregoing reaction formula can be represented by the following general formula.

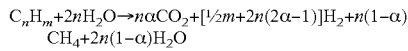

$$C_nH_m+2nH_2O \rightarrow n\alpha CO_2+[\tfrac{1}{2}m+2n(2\alpha-1)]H_2+n(1-\alpha)CH_4+2n(1-\alpha)H_2O$$

Here, n represents an average atomicity of C, and m represents an average atomicity of H.

In this general formula, $[\tfrac{1}{2}m+2n(2\alpha-1)]$ is the control parameter δ. The control parameter β, which is a ratio of water supply amount/material supply amount, is 2n. The control parameter γ changes when the control parameter δ and n(1−α), which is related to the amount of methane in the fuel (reformed gas), change. Therefore, if the material composition $C_nH_m$ changes, both the control parameter β=2n and the control parameter $\delta=[\tfrac{1}{2}m+2n(2\alpha-1)]$ accordingly change, and the control parameter γ change correspondingly. Therefore, in the present invention, when the fuel cell system 1 is supplied with a material with a different composition, these control parameters β, control parameter δ, and control parameter γ are set based on composition-related information.

Next, modified examples of the present embodiment are described.

Modified Example 1

The above-described basic configuration of the present embodiment is configured to directly acquire and set the material composition. In contrast, the present modified example is configured to acquire composition-related information related to the material composition and identify the material composition based on the acquired composition-related information. In other respects, this example is similar to the foregoing basic configuration.

FIG. 5 is a table showing the relationship between suppliers of materials and the compositions of the materials. In FIG. 5, the "supplier names" represent the names of the material suppliers 101. Likewise, the "material compositions" represent the compositions of the materials supplied from the material suppliers 101. In this table (hereinafter referred to as a "material composition identification table"), the "supplier names" and the "material compositions" are associated with one another. Therefore, it is possible to identify a "material composition" from a "supplier name." In the present invention, such information for identifying the material composition is also collectively referred to as the composition-related information. The just-mentioned "supplier name" is one example of the composition-related information. For example, when the material supplier is "A," the "material composition" is identified as $C_{1.2}H_{4.4}$. When the material supplier is "B," the "material composition" is identified as $C_{1.166}H_{4.332}$.

It should be noted that since the material supply areas covered by the material suppliers contained in this material composition identification table do not cover all over Japan, it is possible that the fuel cell system 1 is installed in an area other than the material supply areas of the material suppliers contained in the material composition identification table. In such cases, a predetermined action is taken as will be discussed later.

This material composition identification table is stored in the data storage device 21 of the control apparatus 9 shown in FIG. 2. The data storage device 21 also stores a later-described material composition setting program, and the computing device 20 reads out this material composition setting program from the data storage device 21 to carry out the setting of the material composition.

Next, the material composition setting operation of the fuel cell system 1 configured as described above is described. The material composition setting operation is accomplished by the control executed by the computing device 20 of the control apparatus 9. The rest of the operations of the fuel cell system 1 is similar to the foregoing basic configuration and is not further elaborated on.

Figure 6:
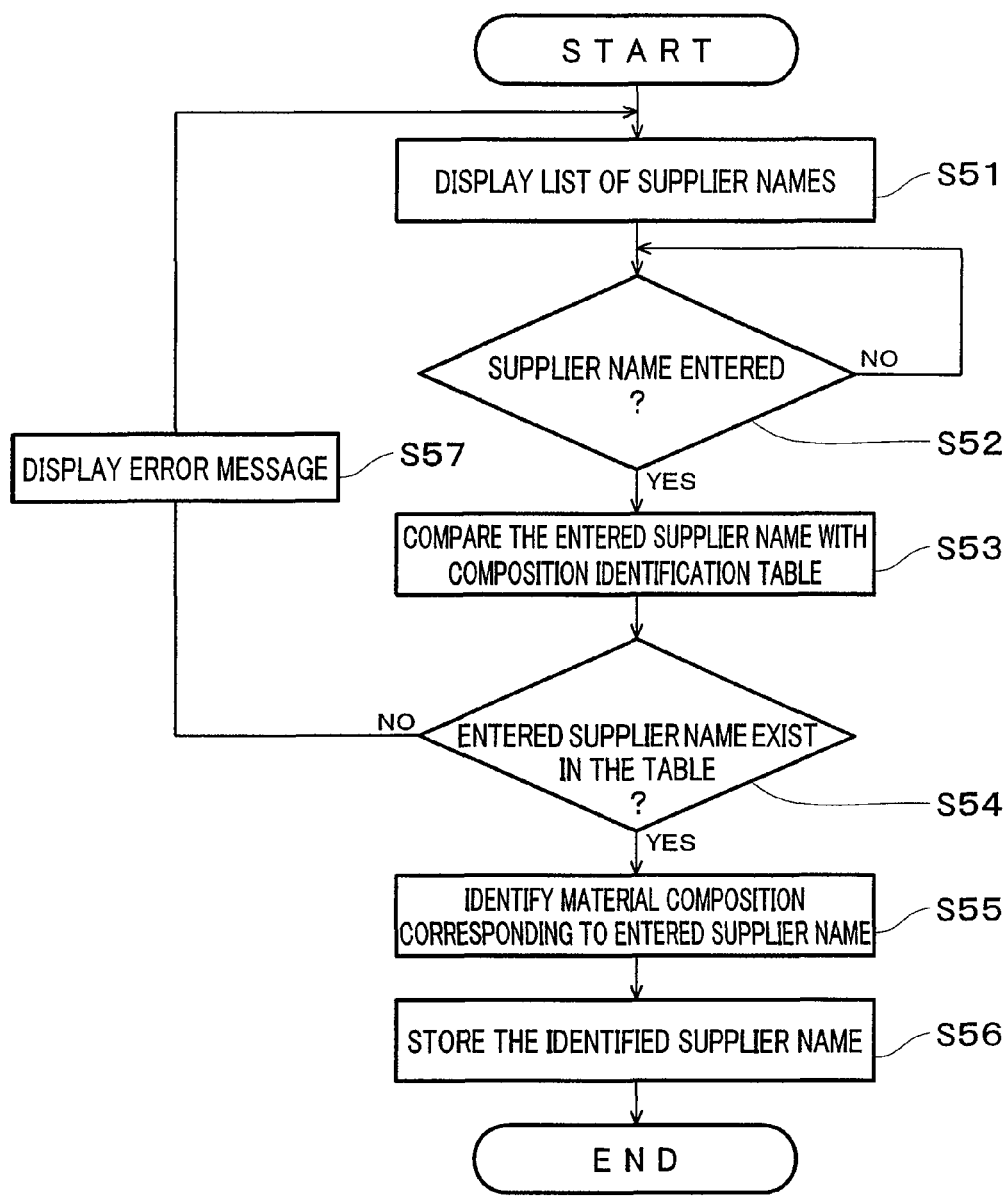
FIG. 6 is a flowchart illustrating a material composition setting program in Modified Example 1.

FIG. 6 is a flowchart illustrating a material composition setting program in the present modified example.

Referring to FIGS. 1, 2, 5, and 6, the user first operates an operation portion (not shown) of the fuel cell system 1 to switch the fuel cell system 1 to the material composition setting mode. This operation is executed by the control from the computing device 20 of the control apparatus 9.

Then, the computing device 20 of the control apparatus 9 displays the list of "supplier names," which are the composition-related information, on the display device 23 (step S51).

Then, the computing device 20 waits for an input of a "supplier name" from the information input device 22 (step S52).

The user selects the applicable "supplier name" from the displayed list and enters it by operating the information input device 22. Then, the computing device 20 reads out the material composition identification table shown in FIG. 5 from the data storage device 21 and compares it with the entered "supplier name" (step S53).

Then, it is determined whether or not a "supplier name" corresponding to the entered "supplier name" exists in the material composition identification table (step S54). If not, an error message is displayed on the display device 23 (step S57), and thereafter, the process returns to step S51. Here, if the cause of this error is an input error of the "supplier name," the steps S51 to S53 are executed by entering a correct "supplier name," and the error is resolved. On the other hand, if the fuel cell system 1 is installed at a geographical point outside the material supply areas of the material suppliers contained in this material composition identification table, the fuel cell system 1 cannot handle the situation, so an action is taken, such as using a predetermined dedicated system.

Conversely, if a "supplier name" corresponding to the entered "supplier name" exists in the material composition identification table, the "material composition" corresponding to that "supplier name" is identified as the material composition that is to be set (step S55).

Subsequently, this identified "material composition" is stored in a predetermined region of the data storage device 21 (step S56).

Thus, the material composition setting is completed.

It should be noted that when a material composition has been stored as a default value in the production stage, the identified "material composition" overwrites the currently stored "material composition" when stored. In other words, the newly identified "material composition" updates the currently set "material composition" when it is set.

In this way, according to Modified Example 1, the composition is identified and set based on the composition-related information and the correspondence of the composition-related information to a power generation material composition, and therefore, the composition of the power generation material can be identified and set automatically even when the composition-related information is a material supplier, which does not directly represent the composition of the power generation material.

Modified Example 2

Modified Example 1 is configured to acquire a material supplier name as the composition-related information and set it as a parameter. In contrast, the present modified example is configured to acquire a material supply area as the composition-related information and set it. In other respects, this example is similar to Modified Example 1.

FIG. 7 is a table showing the relationship between material supply areas and the compositions of the materials. In FIG. 7, the "area names" represent the names of material supply areas of the material suppliers 101. Likewise, the "material compositions" represent the compositions of the materials supplied in the respective material supply areas. In this material composition identification table, the "area names" and the "material compositions" are associated with one another. Therefore, it is possible to identify a "material composition" from a "supplier name." In other words, the present modified example uses the "area name" as an example of the location information of the composition-related information. For example, if the material supply area is "Tokyo," the "material composition" is identified as $C_{1.2}H_{4.4}$.

It should be noted that in the present modified example, the material supply areas also include areas in which the natural gas infrastructure has not been available and each household needs to be provided with a liquefied petroleum gas cylinder, with predetermined area names being assigned to such areas. Nevertheless, because the material supply areas contained in this material composition identification table do not cover all over Japan, it is possible that the fuel cell system 1 is installed in an area other than the material supply areas contained in the material composition identification table. In such cases, the same action as that described in Modified Example 1 above is taken.

This material composition identification table is stored in the data storage device 21 of the control apparatus 9 shown in FIG. 2. The data storage device 21 also stores a later-described material composition setting program, and the computing device 20 reads out this material composition setting program from the data storage device 21 to carry out the setting of the material composition.

Next, the material composition setting operation of the fuel cell system 1 configured as described above is described. The material composition setting operation is accomplished by the control executed by the computing device 20 of the control apparatus 9. The rest of the operations of the fuel cell system 1 is similar to the foregoing basic configuration and is not further elaborated on.

Figure 8:
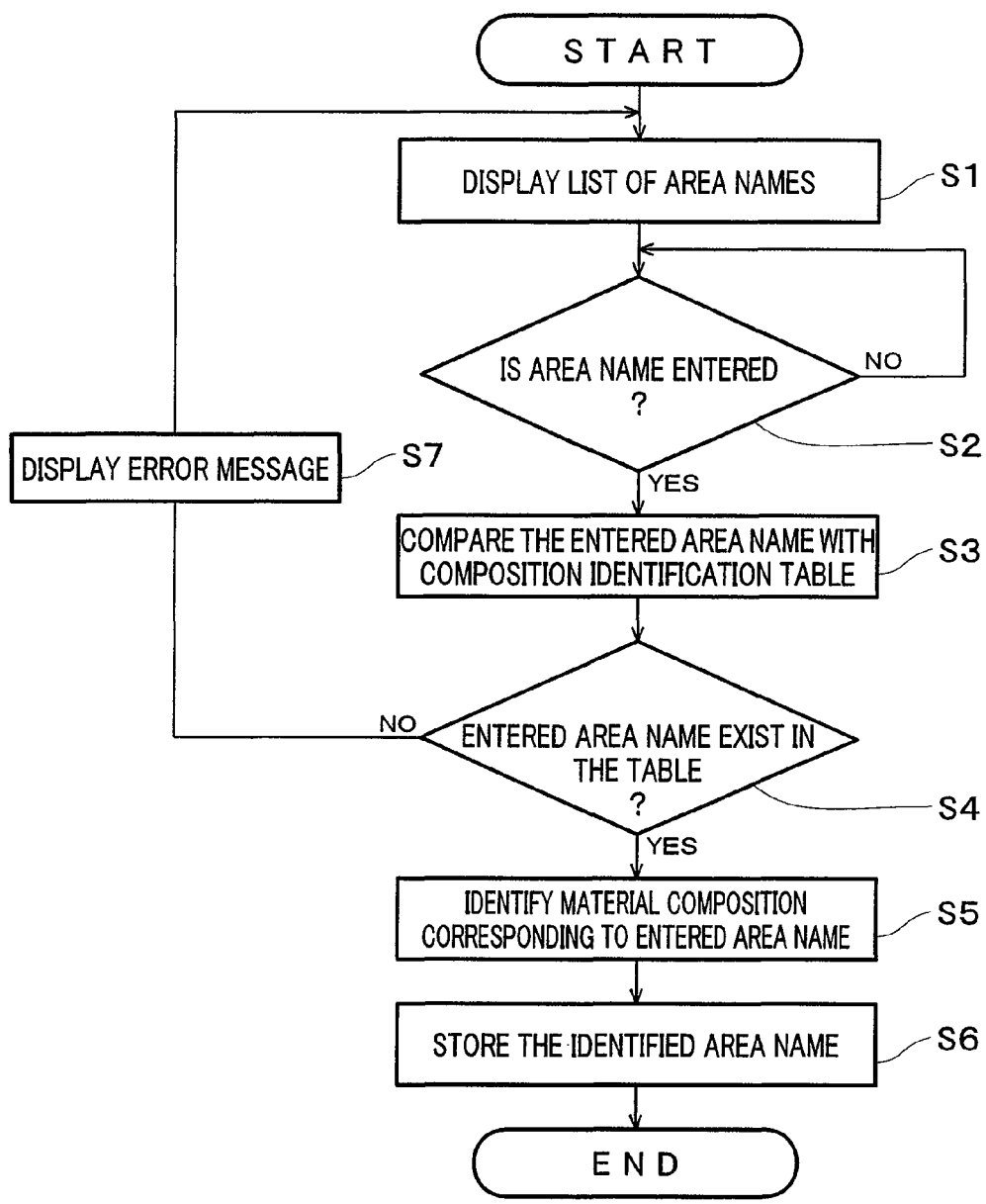
FIG. 8 is a flowchart illustrating a material composition setting program in Modified Example 2.

FIG. 8 is a flowchart illustrating a material composition setting program in the present modified example.

Referring to FIGS. 1, 2, 7, and 8, the user first operates an operation portion (not shown) of the fuel cell system 1 to switch the fuel cell system 1 to the material composition setting mode. This operation is executed by the control from the computing device 20 of the control apparatus 9.

Then, the computing device 20 of the control apparatus 9 displays the list of "area names," which is composition-related information, on the display device 23 (step S1).

Then, the computing device 20 waits for an input of an "area name" from the information input device 22 (step S1).

The user selects the applicable "area name" from the displayed list and enters it by operating the information input device 22. Then, the computing device 20 reads out the material composition identification table shown in FIG. 7 from the data storage device 21 and compares it with the entered "area name" (step S3).

Then, it is determined whether or not an "area name" corresponding to the entered "area name" exists in the material composition identification table (step S4). If not, an error message is displayed on the display device 23 (step S7), and thereafter, the process returns to step S1. Here, if the cause of this error is an input error of the "area name," the steps S1 to S3 are executed by entering a correct "area name," and the error is resolved. On the other hand, if the fuel cell system 1 is installed at a geographical point outside the material supply areas contained in this material composition identification table, the fuel cell system 1 cannot handle the situation, and if that is the case, the same action as that described in Modified Example 1 above is taken.

Conversely, if an "area name" corresponding to the entered "area name" exists in the material composition identification table, the "material composition" corresponding to that "area name" is identified as the material composition that is to be set (step S5).

Subsequently, this identified "material composition" is stored in a predetermined region of the data storage device 21 (step S6). Thereby, the "material composition" is set in the fuel cell system 1. It should be noted that when a material composition has been stored as a default value in the production stage, the identified "material composition" overwrites the currently stored "material composition" when stored. In other words, the newly identified "material composition" updates the currently set "material composition" when it is set.

Thus, the material composition setting is completed.

In this way, according to Modified Example 2, the composition is identified and set based on the composition-related information and the correspondence of the composition-related information to a power generation material composition, and therefore, the composition of the power generation material can be identified and set automatically even when the composition-related information is a material supply area, which does not directly represent the composition of the power generation material.

Modified Example 3

The present modified example is configured to acquire a type of gas as the composition-related information and set it. In other respects, this example is similar to Modified Example 1.

The present modified example assumes that gases as the materials are supplied by the same supplier. Under this assumption, the following example illustrates an embodiment that can support the cases where different types of gases are supplied.

FIG. 16 is a table illustrating types of gases supplied by a fictitious gas supplier.

FIG. 16 shows types of gases, time information, and the components of the gases. The numerical values in FIG. 16 are fictitious values for illustrating the present invention and not actual measured values. Generally, a gas is defined mainly by the combustion speed (MCP) and the Wobbe Index (WI). The types of gases here are six types, "13A," "6A," "L1," "5C," "L2," and "liquefied petroleum gas." For these six types of gases, the components of each of them are specified by supply times. Specifically, with this gas supplier, the same type of gas may have different components depending on the supply time. In FIG. 16, the supply times are represented as time information "Ta" to "Tc."

FIG. 17 is a table showing the relationship between types of gases and the compositions of the materials. In FIG. 17, the "gas types" represent the types of gases shown in FIG. 16. In this material composition identification table, seven types of gases shown in FIG. 16 are specified. In the present modified example, seasonal variations of the components of each gas type are ignored. Therefore, the "material composition" assumes a typical composition of each type of the gases, and the composition is represented by an average molecular formula defined based on the contents of the molecules contained in 1 mole of the material. "$C_{n1}H_{m1}$," "$C_{n2}H_{m2}$," "$C_{n3}H_{m3}$," ..., etc. represent the average molecular formulae.

In this material composition identification table, the "gas types" and the "material compositions" are associated with one another. Therefore, it is possible to identity a "material composition" from a "gas type." In other words, the present modified example uses the "gas type" as an example of the composition-related information. For example, the "material composition" of the gas type "13A" is identified as $C_{n1}H_{m1}$.

This material composition identification table is stored in the data storage device 21 of the control apparatus 9 shown in FIG. 2. The data storage device 21 also stores a later-described material composition setting program, and the computing device 20 reads out this material composition setting program from the data storage device 21 to carry out a material composition setting.

Next, the material composition setting operation of the fuel cell system 1 configured as described above is described. In the following, only the differences from Modified Example 1 are explained.

Figure 18:
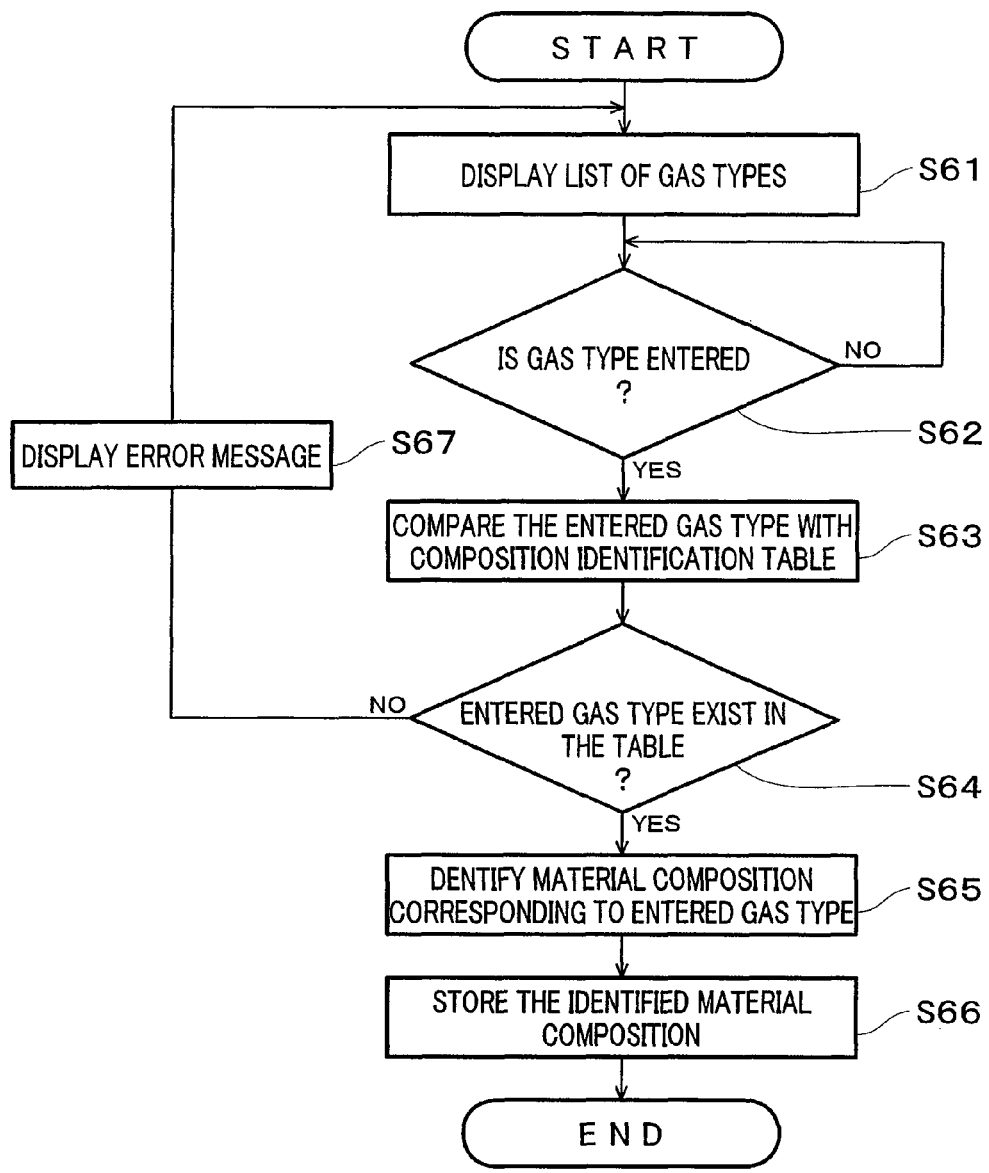
FIG. 18 is a flowchart illustrating a material composition setting program of modified example 3 according to Embodiment 1 of the present invention.

FIG. 18 is a flowchart illustrating a material composition setting program in the present modified example.

As illustrated in FIG. 18, first, the computing device 20 of the control apparatus 9 displays on the display device 23 the list of "types of gases" specified in the material composition identification table as shown in FIG. 17 (step S61).

Then, the computing device 20 waits for an input of a "gas type" from the information input device 22 (step S61).

The user selects the applicable "gas type" from the displayed list and enters it by operating the information input device 22. Then, the computing device 20 reads out the material composition identification table shown in FIG. 17 from the data storage device 21 and compares it with the entered "gas type" (step S63).

Then, it is determined whether or not a "gas type" corresponding to the entered "gas type" exists in the material composition identification table (step S64). If not, an error message is displayed on the display device 23 (step S67), and thereafter, the process returns to step S61. By entering a correct "gas type," the steps S61 to S63 are executed, and this error is resolved.

Conversely, if a "gas type" corresponding to the entered "area name" exists in the material composition identification table, the "material composition" corresponding to that "gas type" is identified as the material composition that is to be set (step S65).

Subsequently, this identified "material composition" is stored in a predetermined region of the data storage device 21 (step S66). Thereby, the "material composition" is set in the fuel cell system 1. It should be noted that when a material composition has already been stored, the identified "material composition" overwrites the currently stored "material composition" when stored. Thus, the material composition setting is completed.

In this way, according to Modified Example 3, the composition of the power generation material is identified and set automatically even when the composition-related information is a gas type, which does not directly represent the composition of the power generation material.

Modified Example 4

The present modified example is configured to acquire time information as the composition-related information and set it. In other respects, this example is similar to Modified Example 3.

The present modified example assumes that the same type of gas is supplied by the same supplier. Under this assumption, the following example illustrates an embodiment that can support the cases where the components of a gas vary depending on time.

FIG. 19 is a table showing the relationship between time information and the compositions of the materials. In FIG. 19, the "time information" represents the time information as shown in FIG. 16. In this material composition identification table, any one of the seven types of gases shown in FIG. 16 is specified. The present modified example illustrates examples for the gas "13A," for which times "Ta" to "Tc" are specified as the time information.

In this material composition identification table, the "time information" and the "material compositions" are associated with one another. Therefore, it is possible to identify a "material composition" from "time information." In other words, the present modified example uses the "time information" as an example of the composition-related information. For example, the "material composition" at the time "Ta" is identified as $C_{n1}H_{m1}$.

This material composition identification table is stored in the data storage device 21 of the control apparatus 9 shown in FIG. 2. The data storage device 21 also stores a later-described material composition setting program, and the computing device 20 reads out this material composition setting program from the data storage device 21 to carry out a material composition setting.

Next, the material composition setting operation of the fuel cell system 1 configured as described above is described. In the following, only the differences from Modified Example 3 are explained.

Figure 20:
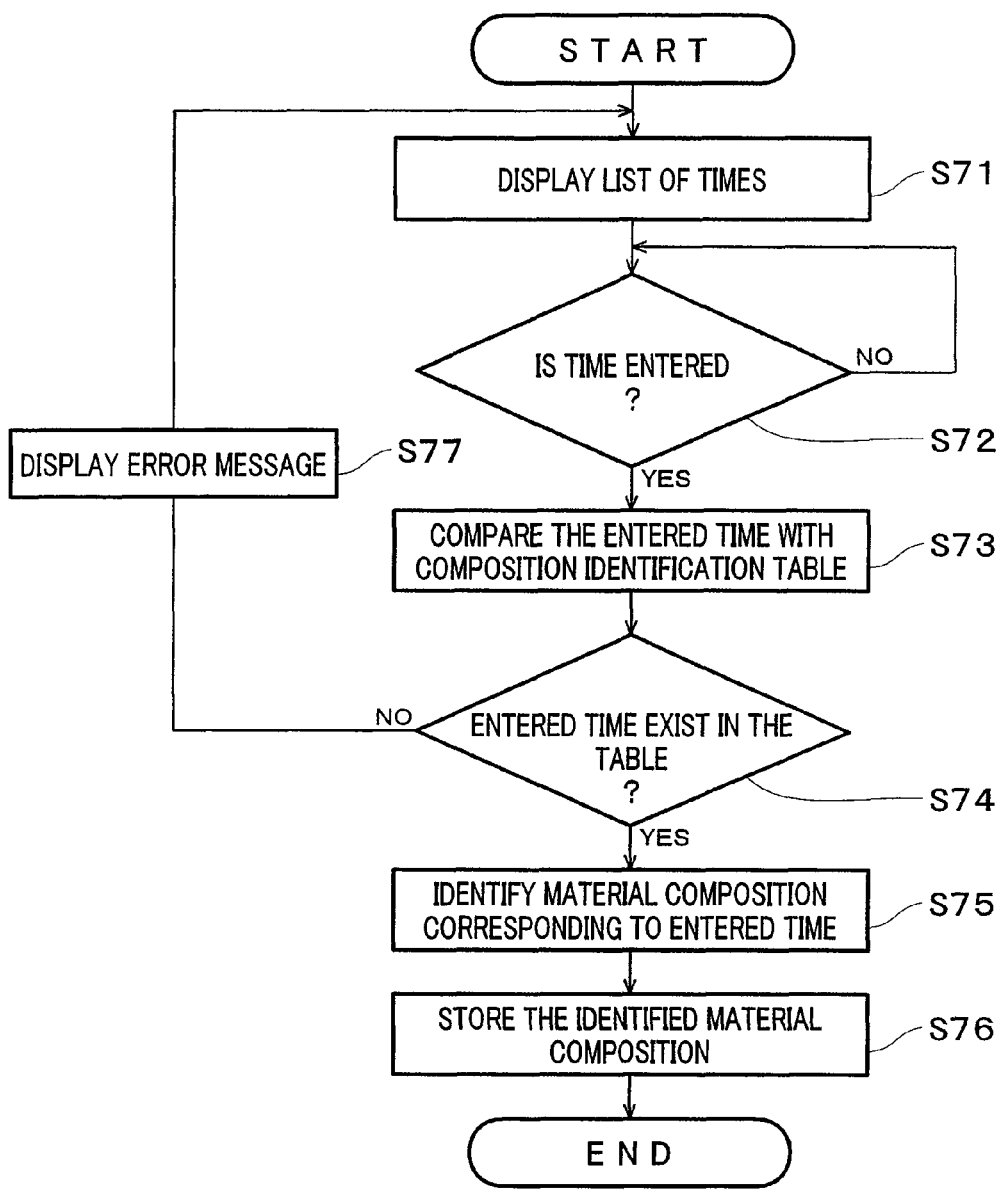
FIG. 20 is a flowchart illustrating a material composition setting program of modified example 4 according to Embodiment 1 of the present invention.

FIG. 20 is a flowchart illustrating a material composition setting program in the present modified example.

As illustrated in FIG. 20, first, the computing device 20 of the control apparatus 9 first displays on the display device 23 the list of "time information" specified in the material composition identification table as shown in FIG. 19 (step S71).

Then, the computing device 20 waits for an input of "time information" from the information input device 22 (step S71).

The user selects the applicable "time information" from the displayed list and enters it by operating the information input device 22. Then, the computing device 20 reads out the material composition identification table shown in FIG. 19 from the data storage device 21 and compares it with the entered "time information" (step S7).

Then, it is determined whether or not the "time information" corresponding to the entered "time information" exists in the material composition identification table (step S74). If not, an error message is displayed on the display device 23 (step S77), and thereafter, the process returns to step S71. By entering correct "time information," the steps S71 to S73 are executed, and this error is resolved.

Conversely, if the "time information" corresponding to the entered "time information" exists in the material composition identification table, the "material composition" corresponding to that "time information" is identified as the material composition that is to be set (step S75).

Subsequently, this identified "material composition" is stored in a predetermined region of the data storage device 21 (step S76). Thereby, the "material composition" is set in the fuel cell system 1. It should be noted that when a material composition has already been stored, the identified "material composition" overwrites the currently stored "material composition" when stored. Thus, the material composition setting is completed.

In this way, according to Modified Example 4, the composition of the power generation material is identified and set automatically even when the composition-related information is time information, which does not directly represent the composition of the power generation material.

Moreover, according to the present embodiment, which includes Modified Examples 1 through 4, the composition-related information is acquired and the material composition is set, and based on the set material composition, power generation is carried out; therefore, the fuel cell system 1 can be used even in different material supply areas.

Embodiment 2

Figure 9:
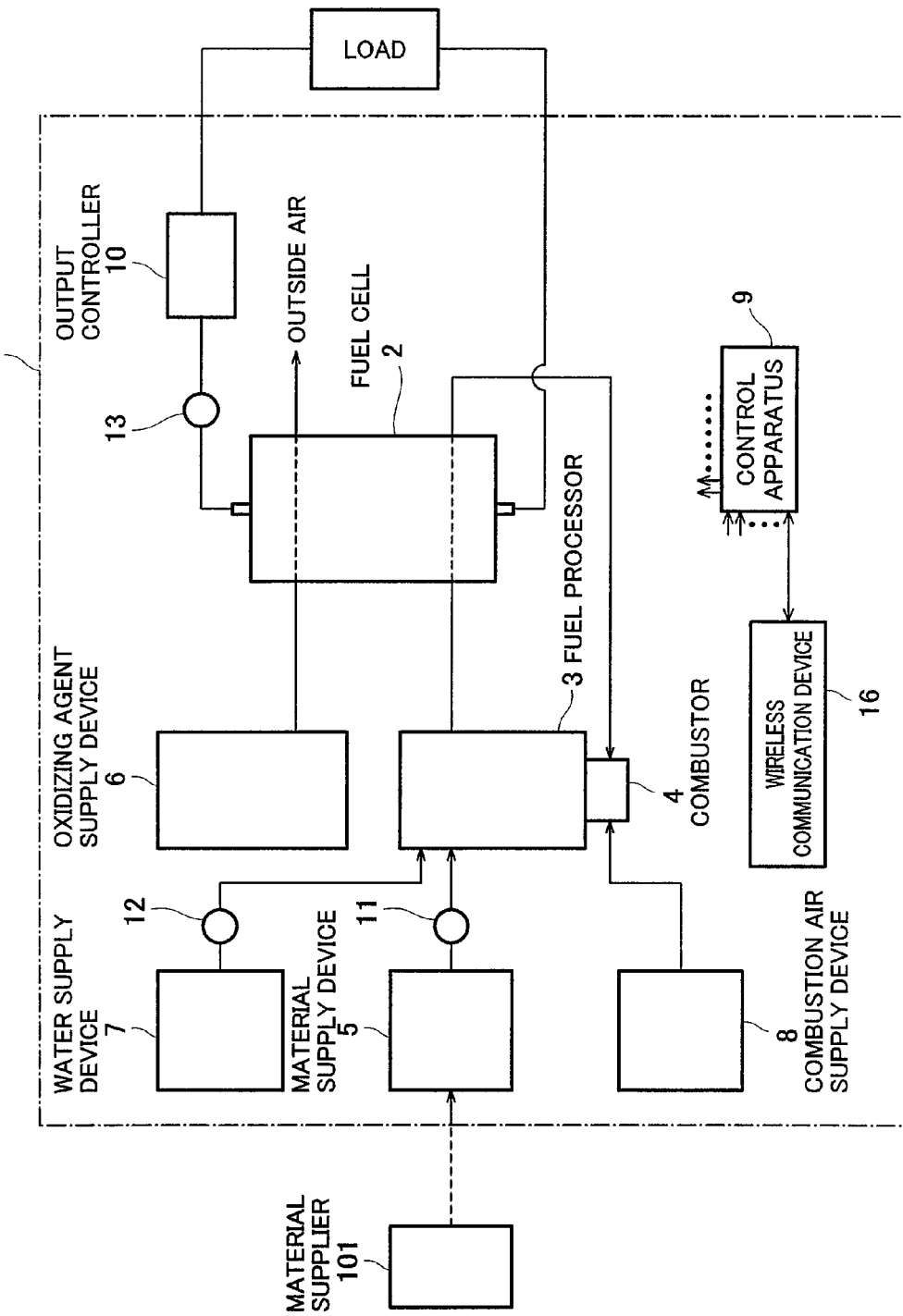
FIG. 9 is a block diagram schematically showing the configuration of a fuel cell system according to Embodiment 2 of the invention.

FIG. 9 is a block diagram schematically illustrating the configuration of a fuel cell system according to Embodiment 2 of the present invention. In FIG. 9, the same reference characters as used in FIG. 1 denote the same or corresponding parts.

As illustrated in FIG. 9, in the present embodiment, the fuel cell system 1 comprises a wireless device 16 connected to the control apparatus 9 as a composition-related information acquiring means of the present invention, and using "location information," which is composition-related information, acquired through this wireless device 16, the control apparatus 9 sets a material composition. In other respects, this embodiment is similar to Embodiment 1.

More specifically, the wireless device 16 is configured to be capable of making wireless communication with GPS (Global Positioning System) satellites. Since the GPS is publicly known, the description thereof is omitted. Likewise, Since the wireless communication device 16 is publicly known, the description thereof is omitted.

Figure 10:
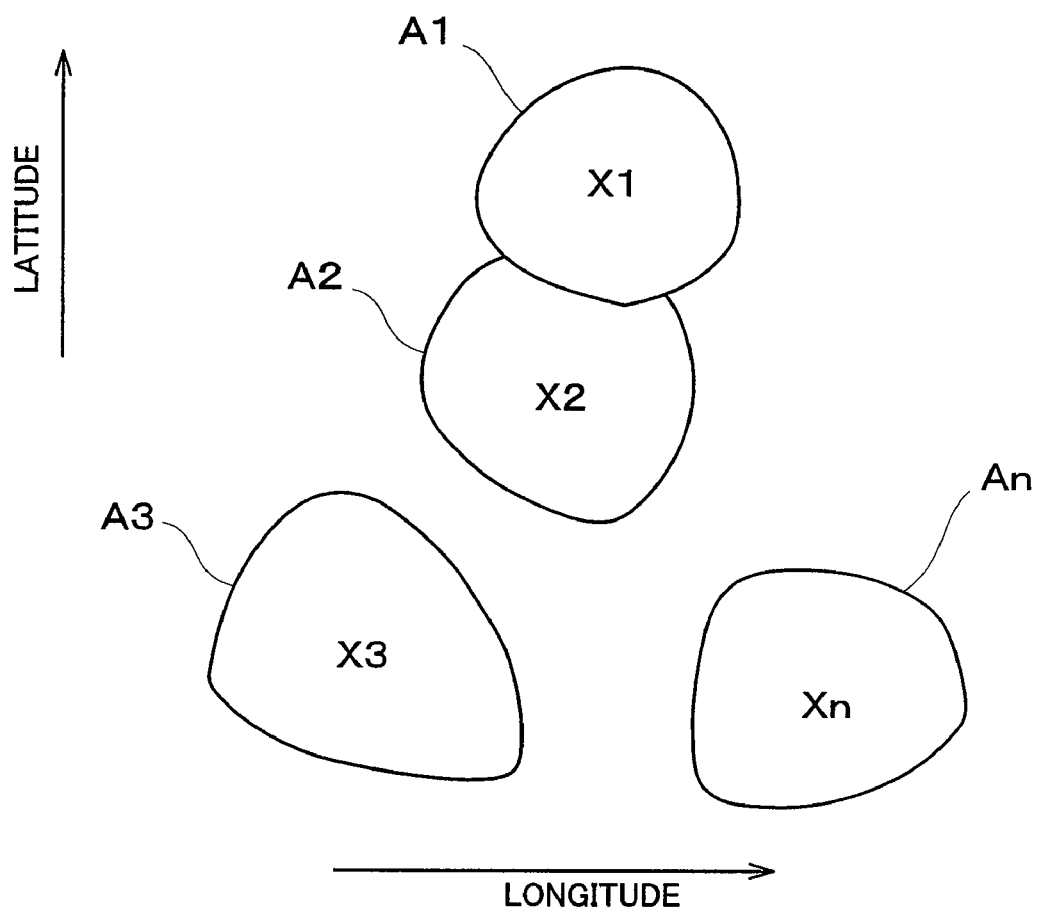
FIG. 10 is a schematic diagram illustrating the concept of a map for identifying material compositions stored in a data storage device of a control apparatus of the fuel cell system shown in FIG. 9.

FIG. 10 is a schematic diagram illustrating the concept of a map for identifying a material composition stored in the data storage device of the control apparatus of the fuel cell system shown in FIG. 9.

In FIG. 10, reference characters A1-An represent supply areas of materials, and reference characters X1-Xn represent the compositions of the materials. In the map for identifying a material composition (hereinafter referred to as a "material composition identification map"), the material supply areas A1-An are allocated in a map (earth's surface) indicating longitude and latitude, and the material supply areas A1-An are associated with respective material compositions X1-Xn. As a consequence, the "material supply area" is first identified from the "location information" represented by a longitude and a latitude, and from the "material supply area," the "material composition" can be identified. This material composition identification map is stored in the data storage device 21 of the control apparatus 9.

Next, the operations of the fuel cell system 1 configured as described above are discussed below.

Figure 11:
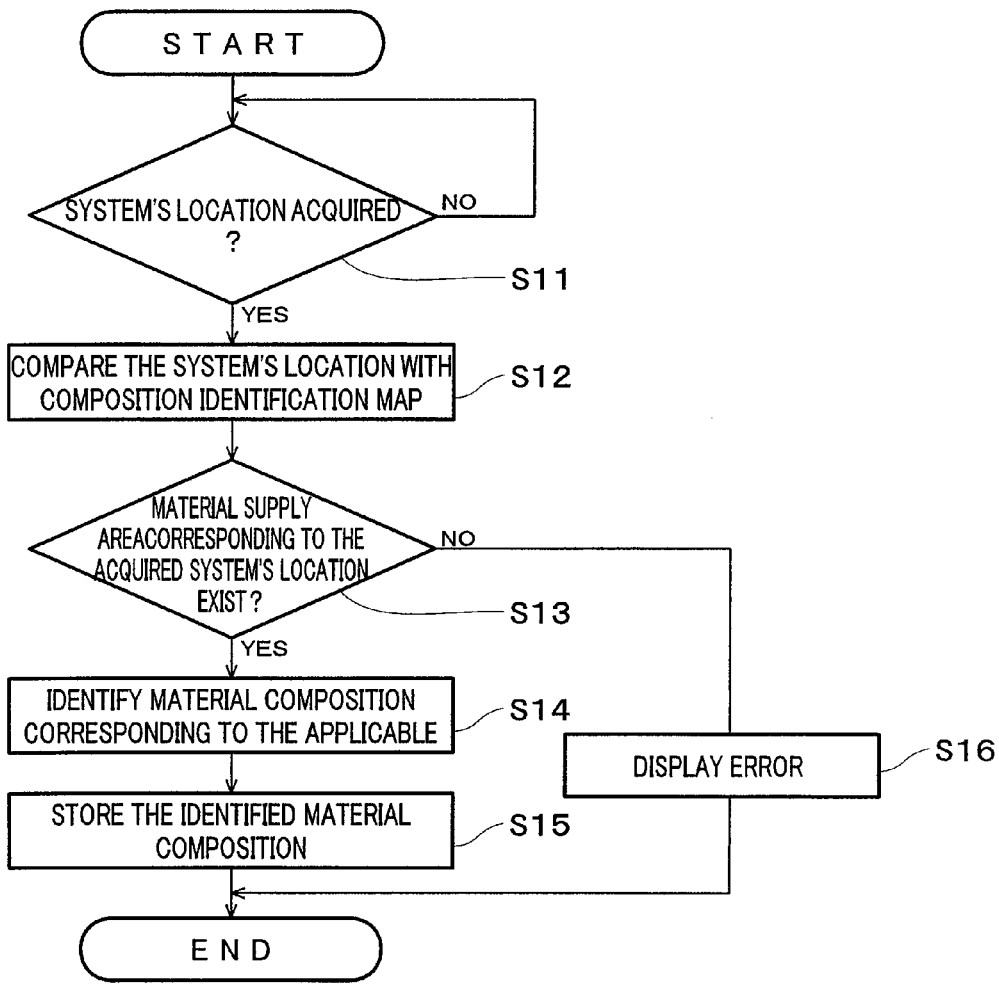
FIG. 11 is a flowchart illustrating a material composition setting program of the fuel cell system shown in FIG. 9.

FIG. 11 is a flowchart illustrating a material composition setting program of the fuel cell system shown in FIG. 9.

Referring to FIGS. 9 to 11, when the user switches the fuel cell system 1 to a material composition setting mode, as described in Embodiment 1, the wireless communication device 16 receives the system's location information from a GPS satellite. In this system's location information, the system's location is represented a longitude and a latitude by on the earth's surface. The wireless communication device 16 outputs this received system's location information to the computing device 20 of the control apparatus 9. The computing device 20 waits for the input of the system's location information (step S11). Upon receiving the system's location information, it reads out the material composition identification map from the data storage device 21, and compares the system's location information to the material composition identification map (step S12).

Subsequently, it is determined whether or not the system's location falls within any of the material supply areas A1-An on the material composition identification map (step S13).

Then, if the system's location does not fall within any of the material supply areas A1-An, an error message is displayed on the display device 23 (step S16). In this case, the fuel cell system 1 cannot handle the situation as described in Embodiment 1, and therefore, an action is taken, such as using a predetermined dedicated system.

On the other hand, if the system's location falls within any of the material supply areas A1-An, a material composition X1-Xn is identified from the applicable supply area A1-An (step S14), and this is stored in the data storage device 21 (step S15). Thereby, the "material composition" is set.

In this way, according to the present embodiment, the composition of the power generation material can be identified and set automatically even when the composition-related information is location information from GPS, which does not directly represent the composition of the power generation material.

Next, a modified example of the present embodiment is described.

In this modified example, the material composition identification table stored in the data storage device 21 is such that a predetermined earth's surface (e.g., the entire area of Japan) is divided into very small regions in a matrix form, and information of respective locations of the very small regions and the material compositions in the respective locations are associated with one another. In this case, for example, the representative location (longitude and latitude) of each of the very small regions is rounded off to a predetermined number of decimal places is defined as the location information of that very small location.

Subsequently, upon receiving the system's location information, the computing device 20 reads out the material composition identification table from the data storage device 21 and compares the system's location information with the foregoing longitude and latitude rounded off to a predetermined number of decimal places. Then, the material composition associated with the location information corresponding to the rounded-off system's location information is stored in the data storage device 21 as the material composition of the fuel cell system 1.

Thereby, the "material composition" is set. By setting the material composition as well, the same advantageous effects as with the above-described basic configuration (the configuration shown in FIG. 11) can be obtained.

Embodiment 3

Figure 12:
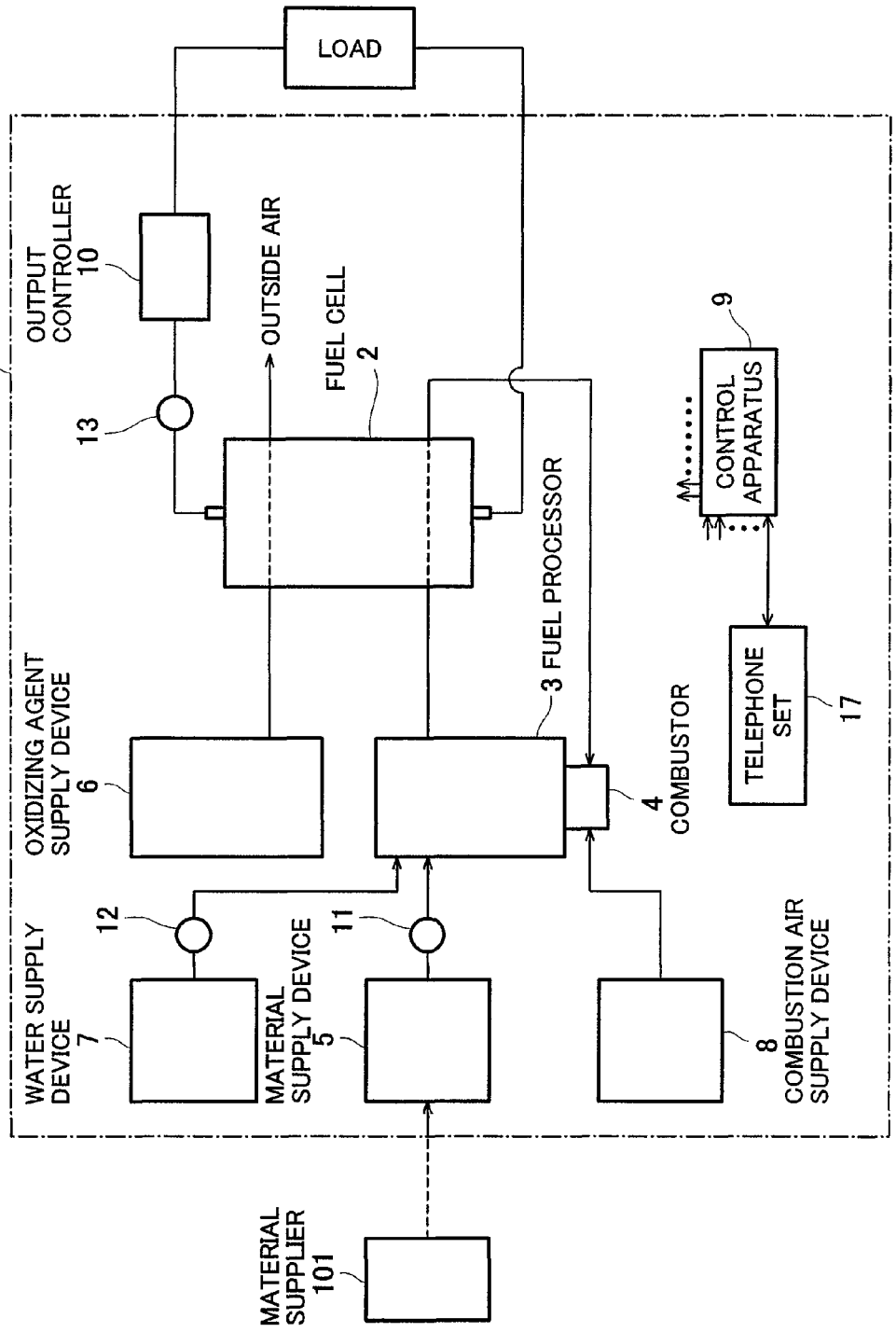
FIG. 12 is a block diagram schematically showing the configuration of a fuel cell system according to Embodiment 3 of the invention.

FIG. 12 is a block diagram schematically illustrating the configuration of a fuel cell system according to Embodiment 3 of the present invention. In FIG. 12, the same reference characters as used in FIG. 1 denote the same or corresponding parts.

As illustrated in FIG. 12, in the present embodiment, the fuel cell system 1 comprises a telephone set 17 connected to the control apparatus 9 as the composition-related information acquiring means, and the control apparatus 9 sets the composition of the material using an area code, serving as the composition-related information, acquired through this telephone set 17. In other respects, this embodiment is similar to Embodiment 1.

More specifically, the telephone set 17 is connected to a telephone network. The configurations of the telephone network and the telephone set 17 are publicly known, and therefore the description thereof is omitted. The computing device 20 of the control apparatus 9 is connected to an external input/output terminal of the telephone set 17 (connection terminal for facsimile or the like) via an interface (not shown). Meanwhile, for example, a predetermined server (referred to as a service server; not shown) of a service station of the fuel cell system 1 is connected to the telephone network via a telephone set. This server is constituted by a computer, and is configured to be capable of making data communication with a computer (the control apparatus 9 herein) via various telephone sets and telephone networks. Specifically, upon receiving a telephone call, this server acquires the area code of the telephone number of the caller from the calling signal of the caller's telephone set (the telephone set 17 herein). Then, when receiving a "notification request for the system's area code" from the caller's computer (the control apparatus 9 herein), the server transmits the acquired area code to the caller's computer.

FIG. 13 is a schematic diagram illustrating a material composition identification table stored in a data storage device of a control apparatus of the fuel cell system shown in FIG. 12.

Referring to FIG. 13, the "area codes" as the composition-related information and the "material compositions" are associated with one another in this material composition identification table. Therefore, it is possible to identify a "material composition" from an "area code." For example, if the material supply area with the area code "03," the "material composition" is identified as $C_{1.2}H_{4.4}$. This material composition identification table is stored in the data storage device 21 of the control apparatus 9.

Next, the operations of the fuel cell system 1 configured as described above are discussed below.

Figure 14:
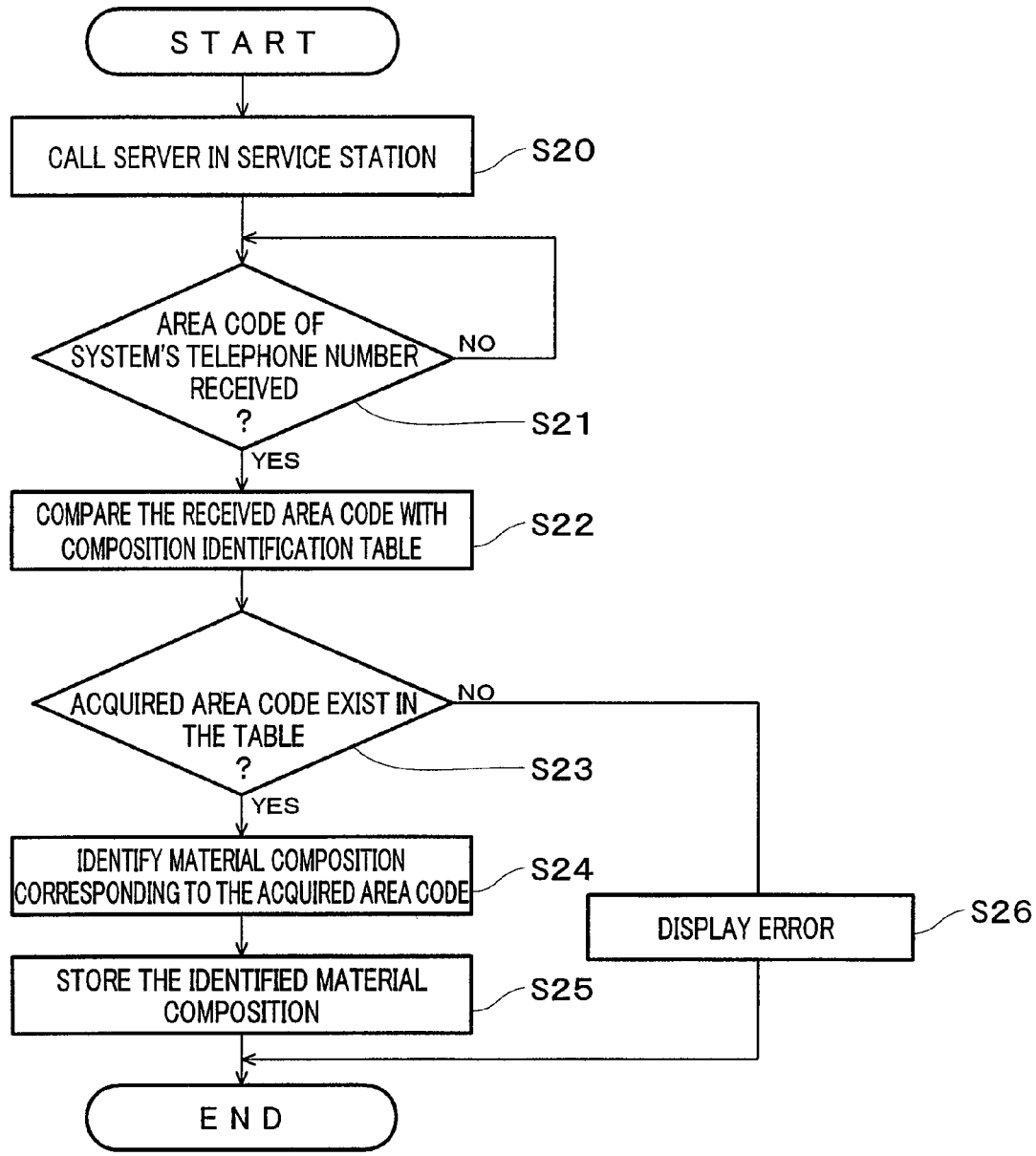
FIG. 14 is a flowchart illustrating a material composition setting program of the fuel cell system shown in FIG. 12.

FIG. 14 is a flowchart illustrating a material composition setting program of the fuel cell system shown in FIG. 12.

Referring to FIGS. 12 to 14, when the user switches the fuel cell system 1 to a material composition setting mode, as described in Embodiment 1, the computing device 20 of the control apparatus 9 calls the service server of the service station via the telephone set 17 to transmit a "notification request for the system's area code" (step S20).

Then, the computing device 20 waits for the area code of the telephone number of the system sent from the service server (step S21).

On the other hand, the service server that has received the telephone call receives the "notification request for the system's area code," and transmits the area code of the telephone number of the telephone set 17, which has been acquired from the calling signal of the telephone set 17, to the control apparatus 9.

Thereby, the computing device 20 of the control apparatus 9 receives the area code of the telephone number of the telephone set 17 (i.e., the system's area code) from the service server.

Next, the computing device 20 reads out the material composition identification table from the data storage device 21 and compares the system's area code with the material composition identification table (step S22).

Subsequently, it is determined whether or not the system's area code exists in the material composition identification table (step S23).

Then, if the system's area code does not exist in the material composition identification table, an error message is displayed on the display device 23 (step S26). In this case, the fuel cell system 1 cannot handle the situation as described in Embodiment 1, and therefore, an action is taken, such as using a predetermined dedicated system.

In contrast, if the system's area code exists in the material composition identification table, the "material composition" is identified from the "area code" (step S14) and is stored in the data storage device 21 (step S15). Thereby, the "material composition" is set.

As described above, the present embodiment makes it possible to set the material composition automatically for the fuel cell system 1.

Although only the area code of the telephone number has been described to be used as the composition-related information in the above-described description, a local office number may be used also. By doing so, it becomes possible to identify the material supply area, and eventually the material composition more accurately. In addition, it is also possible to input the area codes in which the fuel cell system can be expected to be installed directly using the information input device 22, as described in Embodiment 1, without using the telephone set 17.

Embodiment 4

Figure 15:
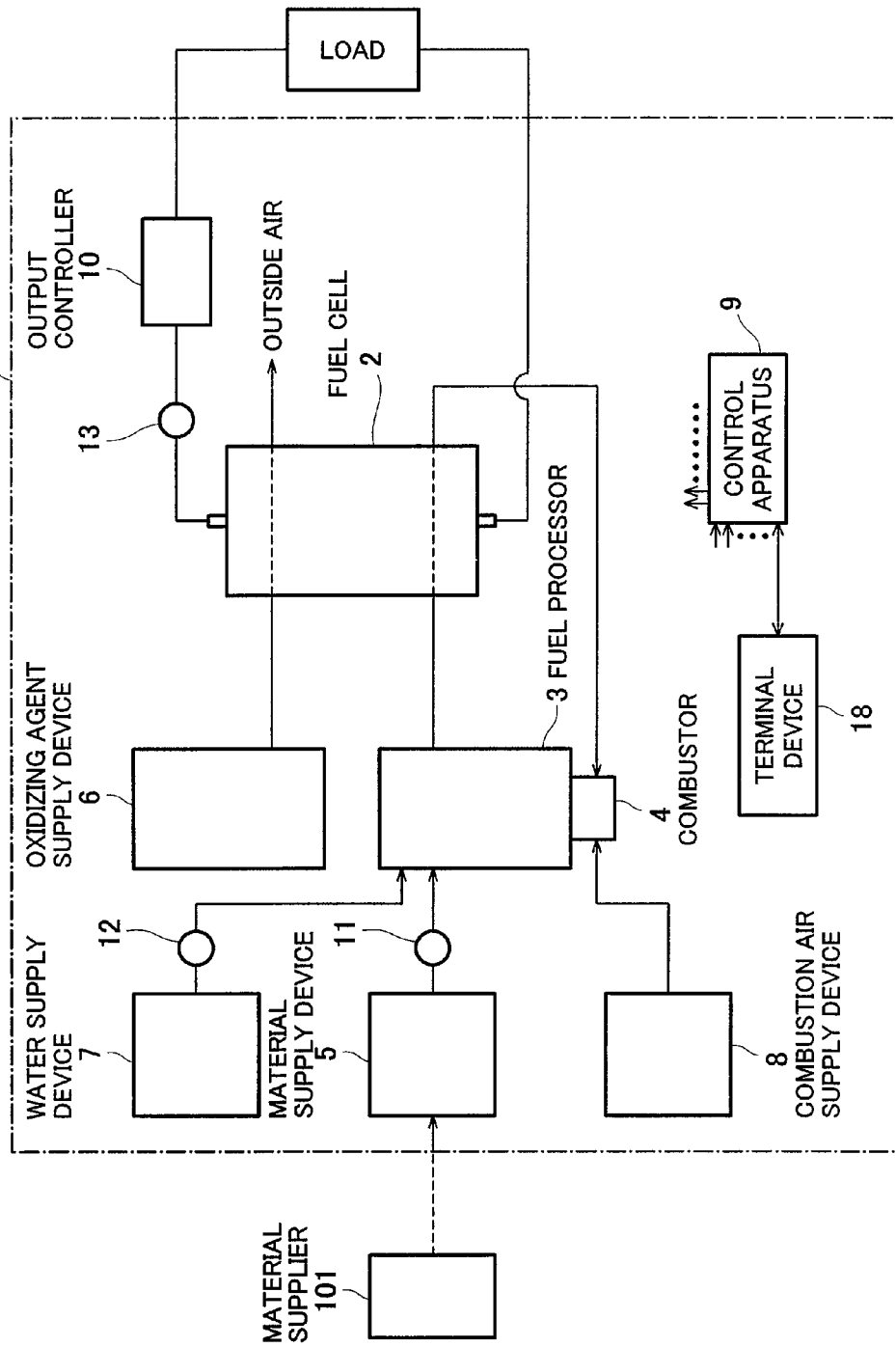
FIG. 15 is a block diagram schematically showing the configuration of a fuel cell system according to Embodiment 4 of the invention.

FIG. 15 is a block diagram schematically illustrating the configuration of a fuel cell system according to Embodiment 4 of the present invention. In FIG. 15, the same reference characters as used in FIG. 1 denote the same or corresponding parts.

As illustrated in FIG. 15, in the present embodiment, the fuel cell system 1 comprises a terminal device 18 connected to the control apparatus 9 as the composition-related information acquiring means, and the control apparatus 9 sets the composition of the material using the composition-related information acquired through this terminal device 18. In other respects, this embodiment is similar to Embodiment 1.

More specifically, the terminal device 18 is a known data communication terminal device and comprises a computer and its peripherals. The terminal device 18 is connected to a data communication network. Examples of the data communication network include the Internet, LAN, and CATV. The computing device 20 of the control apparatus 9 is connected to this terminal device 18.

In the present embodiment, the material composition identification table as shown in FIG. 7 is stored in the data storage device 21 of the control apparatus 9.

With the fuel cell system 1 thus configured, when the user switches the fuel cell system 1 to a material composition setting mode as described in Embodiment 1, the computing device 20 of the control apparatus 9 makes data communication with a predetermined terminal device (for example, a service server (not shown) in a service station of the manufacturer of the fuel cell system 1) via the terminal device 18 to thereby acquire the "area name" in which the system is installed. The rest of the operations thereafter are similar to Embodiment 1, and therefore, the description thereof is omitted.

Here, the "area name" in which the fuel cell system 1 is installed may be identified, for example, in the following manner.

Specifically, when shipping the fuel cell system 1, the manufacturer of the fuel cell system 1 registers (stores), in the service server, the serial number that is associated with the shipping address. The service server also stores an association table between addresses and "area names." On the other hand, the serial number of the fuel cell system 1 is stored in the computing device 20 of the control apparatus 9. The computing device 20 of the control apparatus 9 transmits its serial number via the terminal device 18 when making data communication with the service server. The service server acquires the shipping address of that fuel cell system 1 from the transmitted serial number, and identifies the "area name" from the acquired address. Then, it transmits the identified "area name" to the terminal device 18 as described above.

Thereby, the material composition can be automatically set in the fuel cell system 1.

Next, a modified example of the present embodiment is described.

Modified Example

In the present modified example, the material composition identification table as shown in FIG. 13 is stored in the data storage device 21 of the control apparatus 9.

With the fuel cell system 1 thus configured, when the user switches the fuel cell system 1 to a material composition setting mode as described in Embodiment 1, the computing device 20 of the control apparatus 9 makes data communication with a predetermined terminal device (for example, a service server in a service station of the manufacturer of the fuel cell system 1) via the terminal device 18 to thereby acquire the "area code" of the material supply area in which the system is installed. The rest of the operations thereafter are similar to Embodiment 3, and therefore, the description thereof is omitted.

Here, the "area code" in which the fuel cell system 1 is installed may be identified, for example, in the following manner.

Specifically, when shipping the fuel cell system 1, the manufacturer of the fuel cell system 1 registers (stores), in the service server, the serial number that is associated with the shipping address. The service server also stores an association table between addresses and "area codes." On the other hand, the serial number of the fuel cell system 1 is stored in the computing device 20 of the control apparatus 9. The computing device 20 of the control apparatus 9 transmits its serial number via the terminal device 18 when making data communication with the service server. The service server acquires the shipping address of that fuel cell system 1 from the transmitted serial number, and identifies the "area code" from the acquired address. Then, it transmits the identified "area code" to the terminal device 18 as described above.

Thereby, the material composition can be automatically set in the fuel cell system 1.

Embodiment 5

In Embodiments 1 Through 4, the Material Composition is First identified and set based on composition-related information, and then, based on the material composition, control parameters $\beta$, $\gamma$, and $\delta$ are set. In Embodiment 5 of the present invention, the control parameters $\beta$, $\gamma$, and $\delta$ are set directly based on the composition-related information. In other respects, this embodiment is similar to Modified Example 1 of Embodiment 1.

FIG. 21 is a table, which illustrates the relationship between suppliers of materials and control parameters, used in a fuel cell system according to the present embodiment. In FIG. 21, the "supplier names" represent the names of the material suppliers 101. "Control parameter $\beta$," "control parameter $\gamma$," and "control parameter $\delta$" are as defined in Embodiment 1. These "control parameter $\beta$," "control parameter $\gamma$," and "control parameter $\delta$" are calculated in advance from the material compositions identified based on composition-related information, according to the procedure described in Embodiment 1. This also applies to the following embodiments. In this table (hereinafter referred to as a "control parameter identification table"), "supplier names" are associated with "control parameter $\beta$," "control parameter $\gamma$," and "control parameter $\delta$" (hereinafter also referred to as control parameters $\beta$, $\gamma$, and $\delta$). Therefore, it is possible to identify "control parameter $\beta$," "control parameter $\gamma$," and "control parameter $\delta$" from a "supplier name." For example, if the material supplier is "A," then "control parameter $\beta$," "control parameter $\gamma$," and "control parameter $\delta$" are identified as $\beta_1$, $\gamma_1$, and $\delta_1$, respectively.

This control parameter identification table is stored in the data storage device 21 of the control apparatus 9 shown in FIG. 2. The data storage device 21 also stores a later-described control parameter setting program, and the computing device 20 reads out this control parameter setting program from the data storage device 21 to carry out the setting of the control parameters.

Next, the control parameter setting operation of the fuel cell system 1 configured in the above-described manner is discussed below. This control parameter setting operation is accomplished by the control executed by the computing device 20 of the control apparatus 9. The rest of the operations of the fuel cell system 1 are similar to the foregoing basic configuration of Embodiment 1, and therefore the description thereof is omitted.

Figure 22:
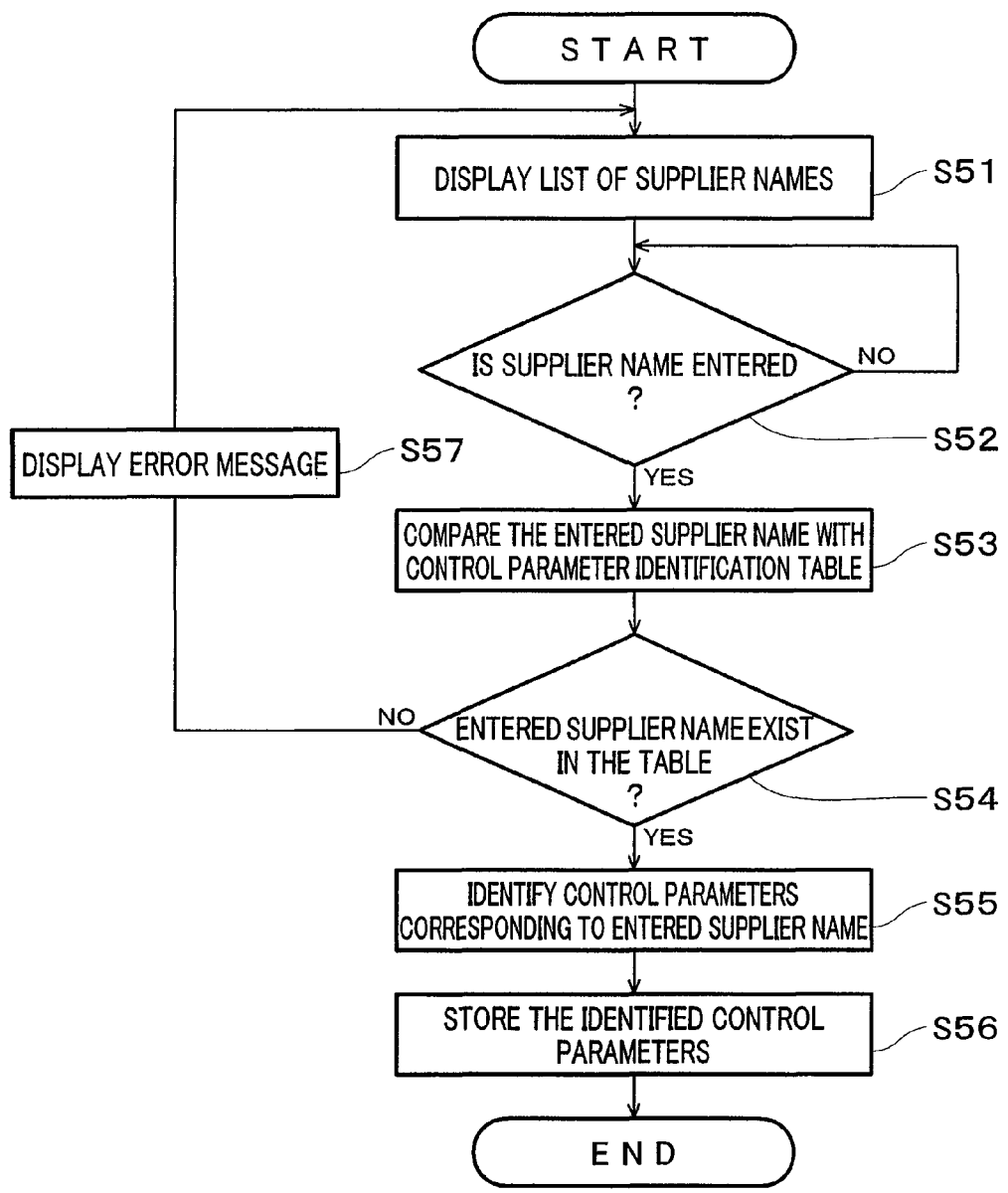
FIG. 22 is a flowchart illustrating a control parameter setting program of the fuel cell system according to Embodiment 5 of the present invention.

FIG. 22 is a flowchart illustrating a control parameter setting program of the fuel cell system according to the present embodiment.

Referring to FIGS. 1, 2, 21, and 22, the user first operates an operation portion (not shown) of the fuel cell system 1 to switch the fuel cell system 1 to the control parameter setting mode. This operation is executed by the control from the computing device 20 of the control apparatus 9.

Then, the computing device 20 of the control apparatus 9 displays the list of "supplier names," which are the composition-related information, on the display device 23 (step S51).

Then, the computing device 20 waits for an input of a "supplier name" from the information input device 22 (step S52).

The user selects the applicable "supplier name" from the displayed list and enters it by operating the information input device 22. Then, the computing device 20 reads out the control parameter identification table shown in FIG. 21 from the data storage device 21 and compares it with the entered "supplier name" (step S53).

Then, it is determined whether or not a "supplier name" corresponding to the entered "supplier name" exists in the material composition identification table (step S54). If not, an error message is displayed on the display device 23 (step S57), and thereafter, the process returns to step S51. Here, if the cause of this error is an input error of the "supplier name," the steps S51 to S53 are executed by entering a correct "supplier name," and the error is resolved. On the other hand, if the fuel cell system 1 is installed at a geographical point outside the material supply areas of the material suppliers contained in this control parameter identification table, the fuel cell system 1 cannot handle the situation, so an action is taken, such as using a predetermined dedicated system.

Conversely, if a "supplier name" corresponding to the entered "supplier name" exists in the control parameter identification table, the "control parameter $\beta$," the "control parameter $\gamma$," and the "control parameter $\delta$" corresponding to that "supplier name" are identified as the control parameter $\beta$, the control parameter $\gamma$, and the control parameter $\delta$ that are to be set (step S55).

Subsequently, these identified "control parameter $\beta$," "control parameter $\gamma$," and "control parameter $\delta$" are stored in predetermined regions of the data storage device 21 (step S56).

Thus, the setting of control parameters is completed.

It should be noted that when control parameters $\beta$, $\gamma$, and $\delta$ have been stored as default values in the production stage, the identified "control parameters $\beta$, $\gamma$, and $\delta$" overwrite the currently stored "control parameters $\beta$, $\gamma$, and $\delta$" when stored. In other words, the newly identified "control parameters $\beta$, $\gamma$, and $\delta$" update the currently set "control parameters $\beta$, $\gamma$, and $\delta$" when they are set.

Then, the computing device 20 of the control apparatus 9 of the fuel cell system 1 controls the fuel cell system 1 based on the control parameters $\beta$, $\gamma$, and $\delta$ set in this way to perform power generation, as described in Embodiment 1.

In this way, according to the present embodiment, the control parameters are identified and set based on the composition-related information and the correspondence of the composition-related information to the control parameters, and therefore, the control parameters can be identified and set automatically even when the composition-related information is a material supplier, which does not directly represent the composition of the power generation material, and the correspondence of the composition-related information with the material composition is unclear.

Embodiment 6

In Embodiment 6 of the present invention, the control parameters $\beta$, $\gamma$, and $\delta$ are set directly based on a "material supply area," which serves as the composition-related information. In other respects, this embodiment is similar to Modified Example 2 of Embodiment 1.

FIG. 23 is a table, which illustrates the relationship between suppliers of materials and control parameters, used in a fuel cell system according to the present embodiment. In FIG. 23, the "area names" represent the names of material supply areas of the material suppliers 101. In this control parameter identification table, "area names" are associated with "control parameter $\beta$," "control parameter $\gamma$," and "control parameter $\delta$." Therefore, it is possible to identify "control parameter $\beta$," "control parameter $\gamma$," and "control parameter $\delta$" from an "area name." For example, if the material supply area is "Tokyo," then "control parameter $\beta$," "control parameter $\gamma$," and "control parameter $\delta$" are identified as $\beta_1$, $\gamma_1$, and $\delta_1$, respectively.

It should be noted that in the present embodiment, the material supply areas include areas in which the natural gas infrastructure has not been available and each household needs to be provided with a liquefied petroleum gas cylinder, with predetermined respective area names being assigned to such areas. Nevertheless, because the material supply areas contained in this material composition identification table do not cover all over Japan, it is possible that the fuel cell system 1 is installed in an area other than the material supply areas contained in the control parameter identification table. In such cases, the same action as that described in Embodiment 5 above is taken.

This control parameter identification table is stored in the data storage device 21 of the control apparatus 9 shown in FIG. 2. The data storage device 21 also stores a later-described control parameter setting program, and the computing device 20 reads out this material composition setting program from the data storage device 21 to carry out the setting of the material composition.

Next, the control parameter setting operation of the fuel cell system 1 configured in the above-described manner is discussed below. The material composition setting operation is accomplished by the control executed by the computing device 20 of the control apparatus 9. The rest of the operations of the fuel cell system 1 are similar to Embodiment 5 above, and therefore the description thereof is omitted.

Figure 24:
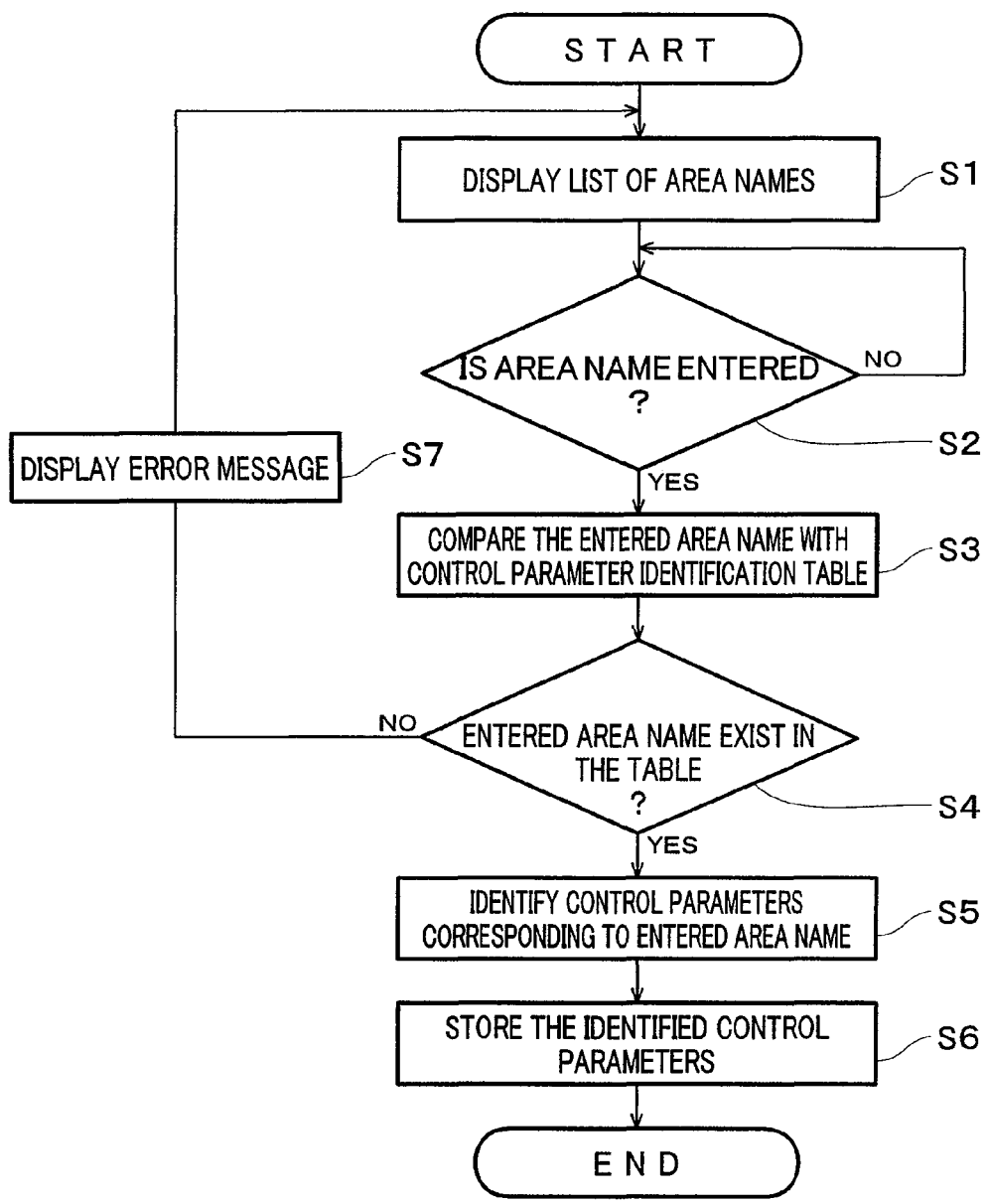
FIG. 24 is a flowchart illustrating a control parameter setting program of the fuel cell system according to Embodiment 6 of the present invention.

FIG. 24 is a flowchart illustrating a control parameter setting program of the fuel cell system according to the present embodiment.

Referring to FIGS. 1, 2, 23, and 24, the user first operates an operation portion (not shown) of the fuel cell system 1 to switch the fuel cell system 1 to the control parameter setting mode. This operation is executed by the control from the computing device 20 of the control apparatus 9.

Then, the computing device 20 of the control apparatus 9 displays the list of "area names" on the display device 23 (step S1).

Then, the computing device 20 waits for an input of an "area name" from the information input device 22 (step S1).

The user selects the applicable "area name" from the displayed list and enters it by operating the information input device 22. Then, the computing device 20 reads out the control parameter identification table shown in FIG. 23 from the data storage device 21 and compares it with the entered "area name" (step S3).

Then, it is determined whether or not an "area name" corresponding to the entered "area name" exists in the control parameter identification table (step S4). If not, an error message is displayed on the display device 23 (step S7), and thereafter, the process returns to step S1. Here, if the cause of this error is an input error of the "area name," the steps S1 to S3 are executed by entering a correct "area name," and the error is resolved. On the other hand, if the fuel cell system 1 is installed at a geographical point outside the material supply areas contained in this control parameter identification table, the fuel cell system 1 cannot handle the situation, and if that is the case, the same action as that described in Embodiment 51 above is taken.

Conversely, if an "area name" corresponding to the entered "area name" exists in the control parameter identification table, the "control parameter $\beta$," the "control parameter $\gamma$," and the "control parameter $\delta$" corresponding to that "area name" are identified as the control parameter β, the control parameter γ, and the control parameter δ that are to be set (step S5).

Subsequently, these identified "control parameter β," "control parameter γ," and "control parameter δ" are stored in predetermined regions of the data storage device 21 (step S6). Thereby, the "control parameter β," the "control parameter γ," and the "control parameter δ" are set in the fuel cell system 1. It should be noted that when control parameters β, γ, and δ have been stored as default values in the production stage, the identified "control parameters β, γ, and δ" overwrite the currently stored "control parameters β, γ, and δ" when stored. In other words, the newly identified "control parameters β, γ, and δ" update the currently set "control parameters β, γ, and δ" when they are set.

In this way, according to the present embodiment, the control parameters are identified and set based on the composition-related information and the correspondence of the composition-related information to the control parameters, and therefore, the control parameters can be identified and set automatically even when the composition-related information is a material supplier, which does not directly represent the composition of the power generation material, and the correspondence of the composition-related information with the material composition is unclear.

Embodiment 7

In Embodiment 7 of the present invention, the control parameters β, γ, and δ are set directly based on a "gas type," which serves as the composition-related information. In other respects, this embodiment is similar to Modified Example 3 of Embodiment 1.

FIG. 25 is a table showing the relationship between types of gases and control parameters. In FIG. 25, "gas types" represent the types of gases shown in FIG. 16. In this control parameter identification table, six types of gases shown in FIG. 16 are specified. In this control parameter identification table, "gas types" are associated with "control parameter β," "control parameter γ," and "control parameter δ." Therefore, it is possible to identify "control parameter β," "control parameter γ," and "control parameter δ" from a "gas type." For example, if the gas type is "13A," then "control parameter β," "control parameter γ," and "control parameter δ" are identified as $β_1$, $γ_1$, and $δ_1$, respectively.

Figure 26:
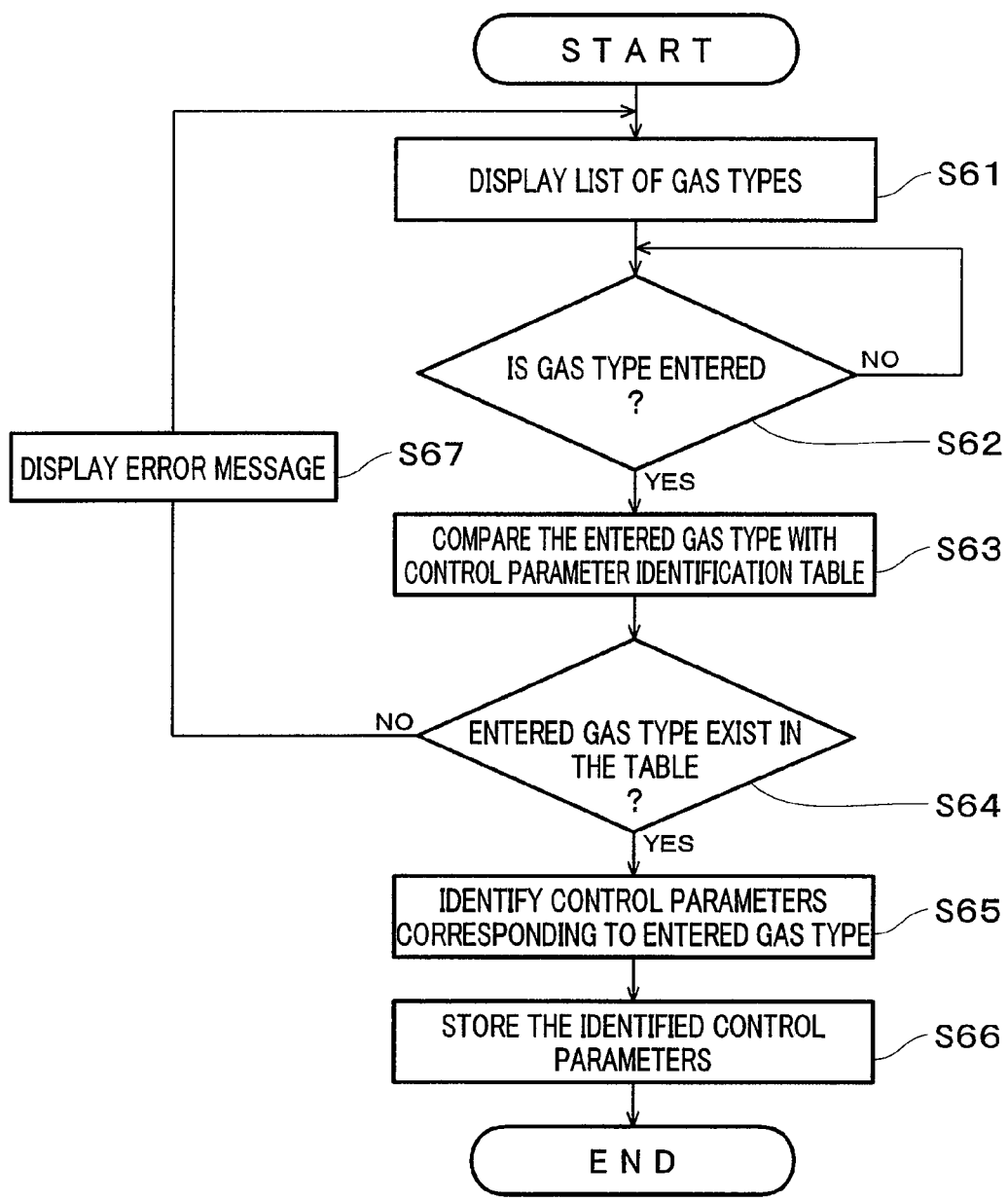
FIG. 26 is a flowchart illustrating a control parameter setting program of the fuel cell system according to Embodiment 7 of the present invention.

FIG. 26 is a flowchart illustrating a control parameter setting program of the fuel cell system according to the present embodiment. In FIG. 26, the same reference characters as used in FIG. 18 denote the same or corresponding steps, and the description thereof is omitted.

The control parameter setting operation in the present embodiment differs from Modified Example 3 of Embodiment 1 in that "control parameters β, γ, and δ" are set in place of a "material composition," but in other respects, the operation is the same as described in Modified Example 3 of Embodiment 1. Then, power generation is performed based on the control parameters β, γ, and δ set in this manner.

In this way, according to Embodiment 7, the control parameters are identified and set automatically to perform power generation even when the composition-related information is a gas type, which does not directly represent the composition of the power generation material, and the correspondence of the composition-related information with the material composition is unclear.

Embodiment 8

In Embodiment 8 of the present invention, the control parameters β, γ, and δ are set directly based on "time information" as the composition-related information. In other respects, this embodiment is similar to Modified Example 4 of Embodiment 1.

FIG. 27 is a table showing the relationship between time information and control parameters. In FIG. 27, the "time information" represents the time information as shown in FIG. 16. In this control parameter identification table, any one of the seven types of gases shown in FIG. 16 is specified. The present modified example illustrates examples for the gas "13A," for which times "Ta" to "Tc" are specified as the time information. In this control parameter identification table, "time information" is associated with "control parameter β," "control parameter γ," and "control parameter δ." Therefore, it is possible to identify "control parameter β," "control parameter γ," and "control parameter δ" from "time information." For example, if the time is "Ta," then "control parameter β," "control parameter γ," and "control parameter δ" are identified as $β_1$, $γ_1$, and $δ_1$, respectively.

Figure 28:
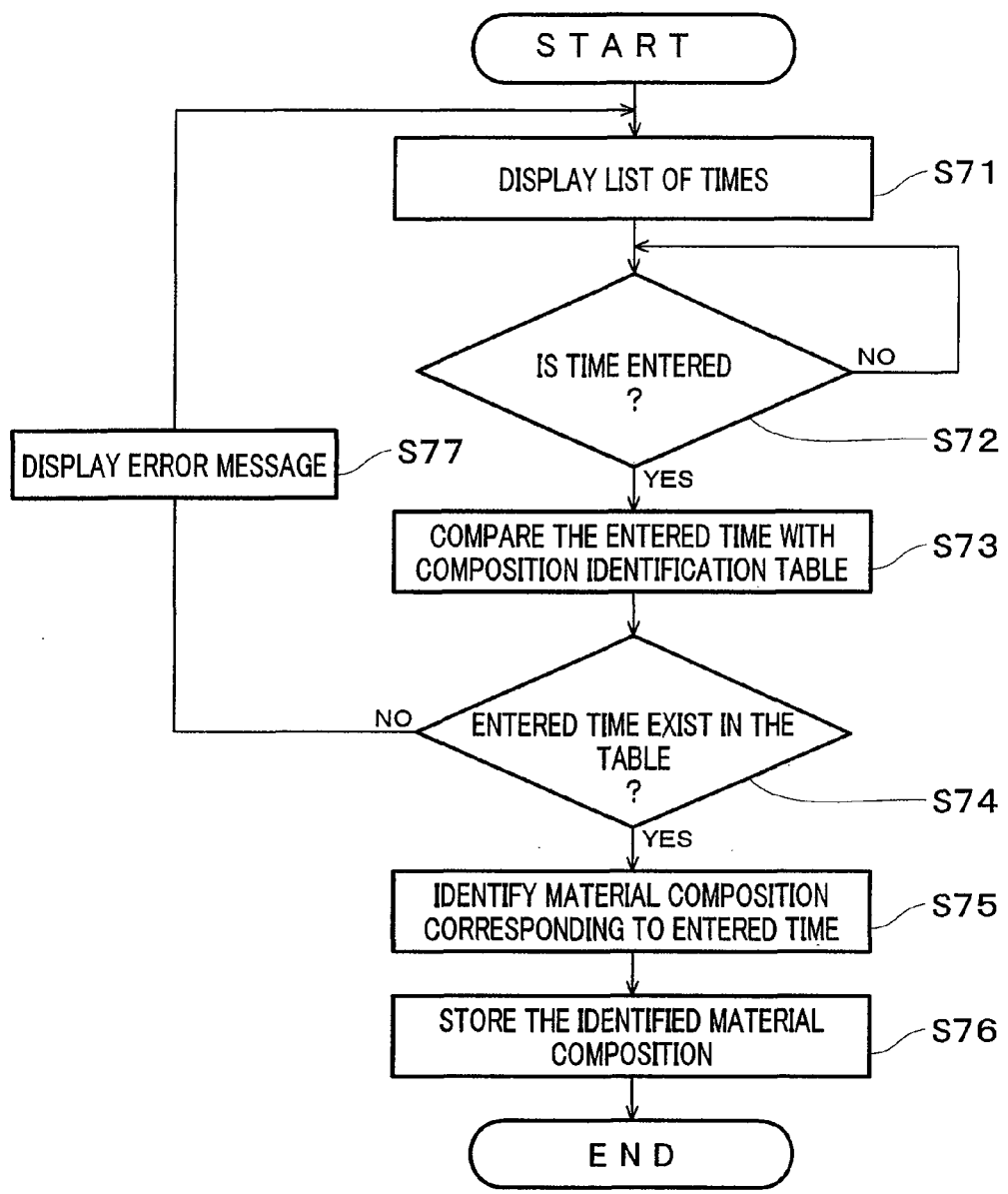
FIG. 28 is a flowchart illustrating a control parameter setting program of the fuel cell system according to Embodiment 8 of the present invention.

FIG. 28 is a flowchart illustrating a control parameter setting program of the fuel cell system according to the present embodiment. In FIG. 28, the same reference characters as used in FIG. 20 denote the same or corresponding steps, and the description thereof is omitted.

The control parameter setting operation in the present embodiment differs from Modified Example 4 of Embodiment 1 in that "control parameters β, γ, and δ" are set in place of a "material composition," but in other respects, the operation is the same as described in Modified Example 4 of Embodiment 1. Then, power generation is performed based on the control parameters β, γ, and δ set in this manner.

In this way, according to Embodiment 8, the control parameters are identified and set automatically to perform power generation even when the composition-related information is time information, which does not directly represent the composition of the power generation material, and the correspondence of the composition-related information with the material composition is unclear.

Embodiment 9

Figure 29:
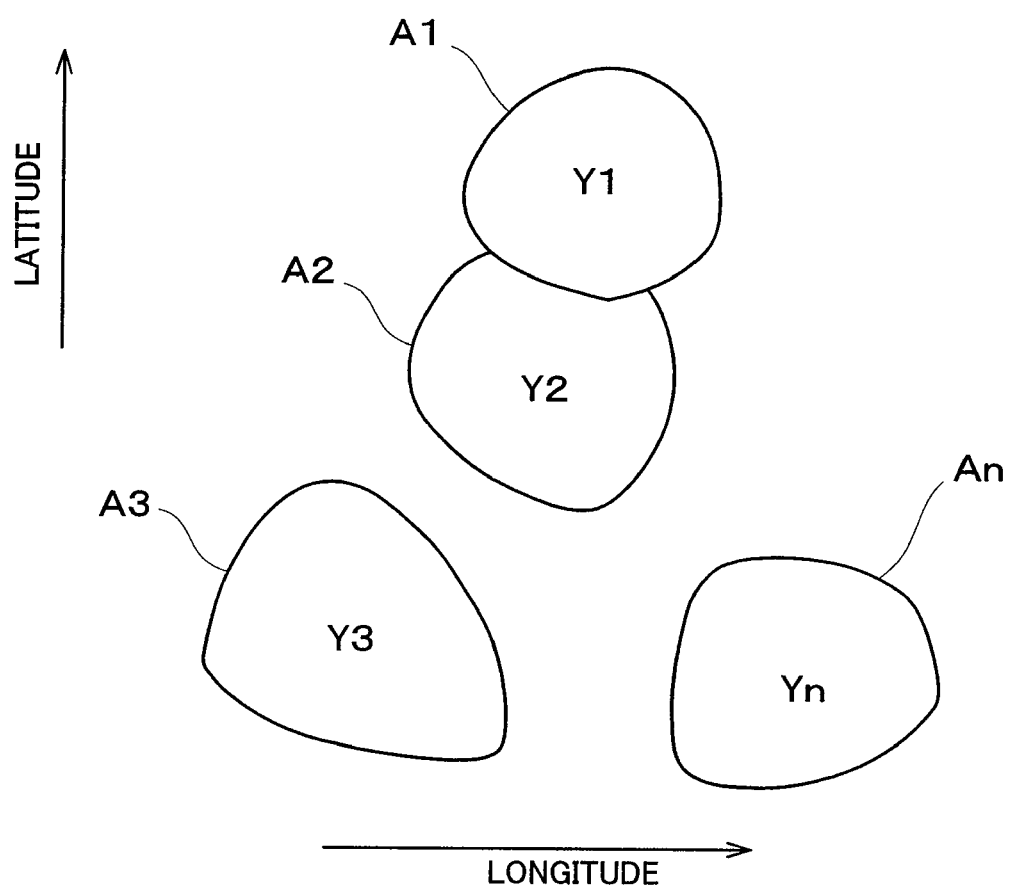
FIG. 29 is a schematic diagram illustrating the concept of a control parameter identification map stored in a data storage device of a control apparatus of a fuel cell system according to Embodiment 9 of the present invention.

FIG. 29 is a schematic diagram illustrating the concept of a control parameter identification map stored in a data storage device of a control apparatus of a fuel cell system according to Embodiment 9 of the present invention.

In FIG. 29, reference characters A1-An represent supply areas of materials, and reference characters Y1-Yn represent respective control parameters $β_1$, $γ_1$, and $δ_1$ to $β_n$, $γ_n$, and $δ_n$ corresponding to the supply areas A1-An.

Figure 30:
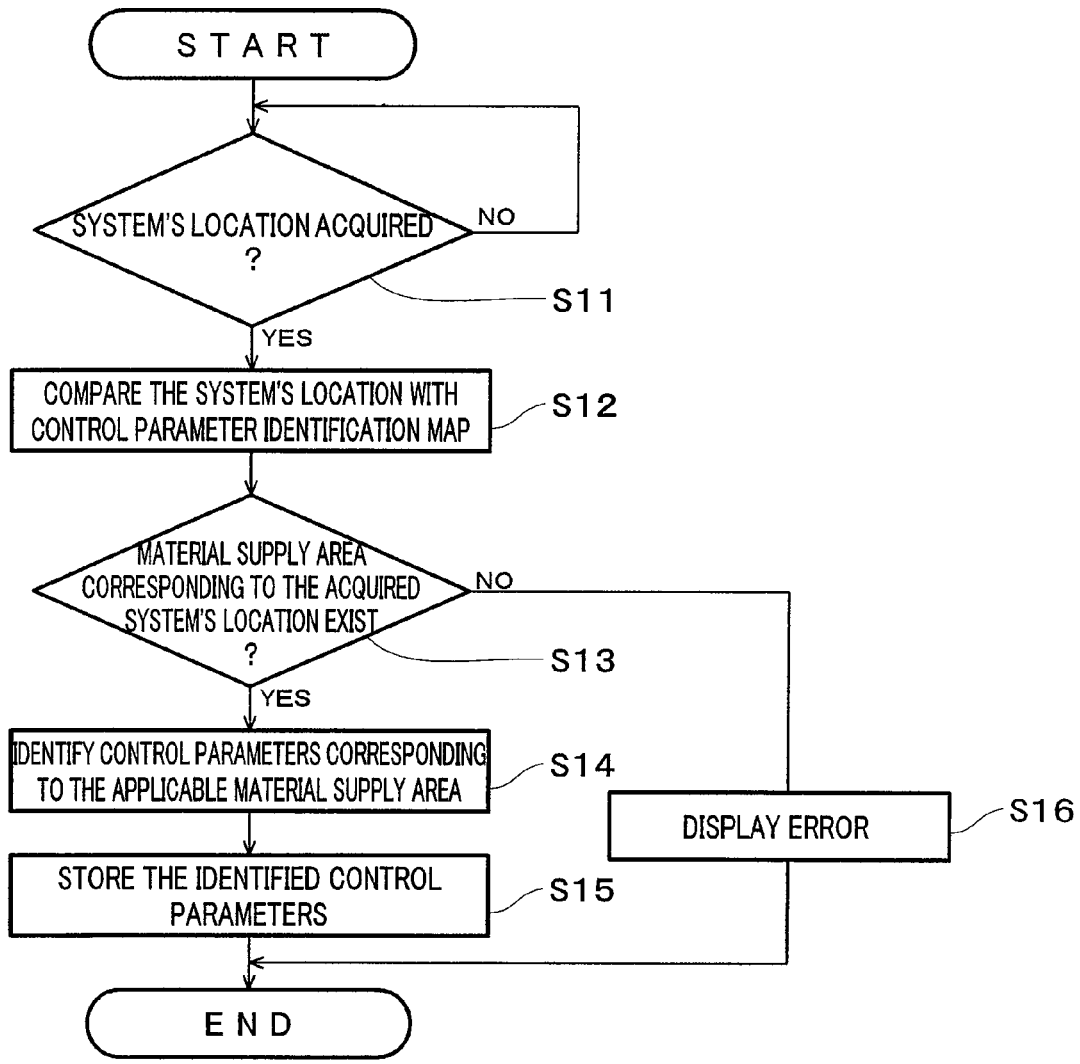
FIG. 30 is a flowchart illustrating a control parameter setting program of the fuel cell system according to Embodiment 9 of the present invention.

FIG. 30 is a flowchart illustrating a control parameter setting program of the fuel cell system according to the present embodiment. In FIG. 30, the same reference characters as used in FIG. 11 denote the same or corresponding steps, and the description thereof is omitted.

As illustrated in FIGS. 29 and 30, the present embodiment uses the control parameter identification map of FIG. 29 in Embodiment 2, in place of the material composition identification map of FIG. 10. Specifically, in the present embodiment, the acquired system's location is compared with the control parameter identification map (steps S11 and S12), and one of the material supply areas A1-An corresponding to the system's location is identified (step S13). Then, one of control parameters Y1-Yn corresponding to the identified one of the material supply areas A1-An is identified and set (steps S14 and S15). In other respects, this embodiment is similar to Embodiment 2.

By employing such a configuration as well, the same advantageous effects as described in Embodiment 2 are obtained.

As a modified example of the present embodiment, a control parameter identification table in which the location information of respective very small regions and control parameters β, γ, and δ are associated with one another is used in the modified example of Embodiment 2, in place of the control parameter identification table in which the location information of very small regions and the material compositions are associated one another. By employing such a configuration, the same advantageous effects as described in the modified example of Embodiment 2 are obtained.

Embodiment 10

FIG. 31 is a schematic view showing a control parameter setting table used in a fuel cell system according to Embodiment 10 of the present invention. As illustrated in FIG. 31, in this control parameter identification table, "area codes" are associated with "control parameter β," "control parameter γ," and "control parameter δ." For example, control parameters $β_1, γ_1$, and $δ_1$ are identified for the composition-related information "03."

Figure 32:
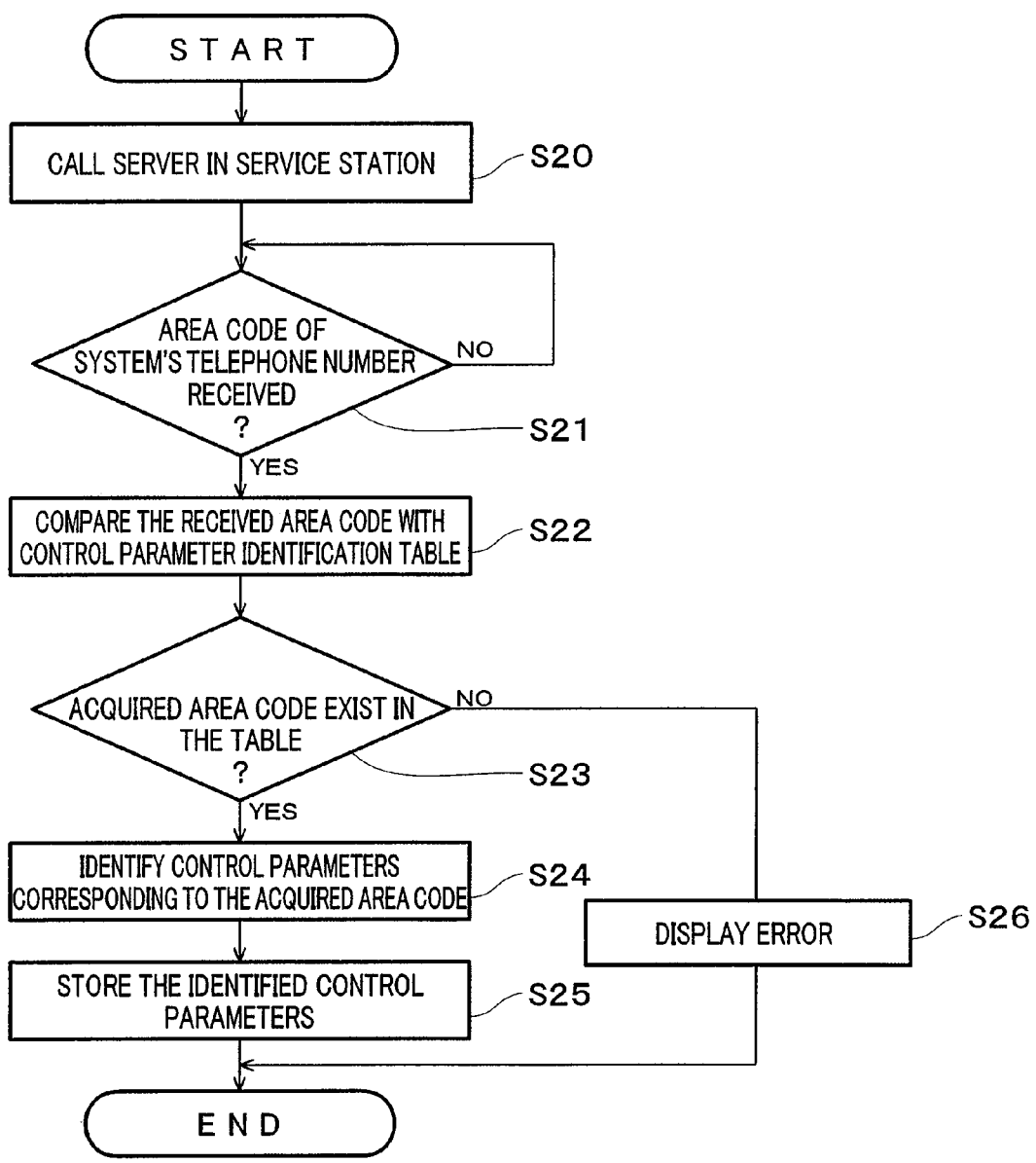
FIG. 32 is a flowchart illustrating a control parameter setting program of the fuel cell system according to Embodiment 10 of the present invention.

FIG. 32 is a flowchart illustrating a control parameter setting program of the fuel cell system according to the present embodiment. In FIG. 32, the same reference characters as used in FIG. 14 denote the same or corresponding steps, and the description thereof is omitted.

As illustrated in FIGS. 31 and 32, the present embodiment uses the control parameter identification table of FIG. 32 in Embodiment 3, in place of the material composition identification table of FIG. 13. Specifically, in the present embodiment, the received area code is compared with the control parameter identification table (steps S20 to S22), and the control parameters β, γ, and δ corresponding to the applicable area code are identified and set (steps S23 to S25). In other respects, this embodiment is similar to Embodiment 3.

By employing such a configuration as well, the same advantageous effects as described in Embodiment 3 are obtained.

Embodiment 11

In Embodiment 11 of the present invention, a control parameter identification table shown in FIG. 23 is stored in the data storage device 21 of the control apparatus 9 of the fuel cell system 1 according to Embodiment 4, in place of the material composition identification table shown in FIG. 7. Thereby, the fuel cell system acquires the "area name" in which the system is installed, and sets control parameters β, γ, and δ directly from the "area name" to generate power.

By employing such a configuration as well, the same advantageous effects as described in Embodiment 4 are obtained.

As a modified example of the present embodiment, the data storage device 21 of the control apparatus 9 of the fuel cell system 1 stores a control parameter identification map shown in FIG. 29 or a control parameter identification table shown in FIG. 31 in the modified example of Embodiment 4, in place of the material composition identification map shown in FIG. 10 or the material composition identification table shown in FIG. 13. By employing such a configuration, the same advantageous effects as described in the modified example of Embodiment 4 are obtained.

It should be noted that although Embodiment 1 employs "area names" as the composition-related information, it is also possible use "location information" or "at least an area code of a telephone number" as the material composition-related information and to input it from the information input device 22, if the composition identification map of FIG. 10 and the composition identification table of FIG. 13 are stored in the data storage device 21 of the control apparatus 9. In addition, a necessary composition identification table may be stored in the data storage device 20, and other composition-related information may be used.

Although the foregoing embodiments 1 to 3 have described that an action such as using a predetermined dedicated apparatus is taken when the fuel cell system 1 cannot handle the situation, it is also possible to provide a means configured to manually input the material composition with the fuel cell system 1 so that the fuel cell system 1 can handle any kind of situations.

In addition, in Embodiments 2 to 11 above, the fuel cell system 1 may be configured such that it is automatically switched to the material composition setting mode or the control parameter setting mode when turning the power on or when starting the system.

Moreover, Embodiments 1 to 11 above employ the configurations in which the fuel cell system 1 has the fuel processor 3, but the fuel processor 3 may be omitted.

Further, when the fuel processor 3 is eliminated, for example, the "material composition" may be represented by compositions containing hydrogen alone.

In addition, although an off-gas is employed as the fuel for the combustor 4 in Embodiments 1 to 11, fuels other than the off-gas, e.g. materials, may be used instead.

From the foregoing description, numerous improvements and other embodiments of the present invention will be readily apparent to those skilled in the art. Accordingly, the foregoing description is to be construed only as illustrative examples and as being presented for the purpose of suggesting the best mode for carrying out the invention to those skilled in the art. Various changes and modifications can be made substantially in the details of the structures and/or functions without departing from the scope and spirit of the invention.

INDUSTRIAL APPLICABILITY

The fuel cell system according to the present invention is useful, for example, as a fuel cell system that is usable even in different material supply areas.

The invention claimed is:

1. A method for operating a fuel cell system including a fuel cell configured to generate electric power using a fuel, the method comprising steps of:
  acquiring composition-related information, the composition-related information being information other than the composition of the power generation material itself
  setting a control parameter for the composition-related information or the composition of the power generation material which is acquired from a table or a map which represents a correspondence between sets of composition-related information and control parameters of said fuel cell system which are predetermined based on the sets of composition of power generation materials or between sets of composition-related information and composition of power generation material which are predetermined based on the sets of power generation materials, in the fuel cell system; and
  controlling an operation of the fuel cell system based on the set control parameter, wherein the composition-related information is information specifying a supply company which supplies the power generation materials.

2. A method for operating a fuel cell system including a fuel cell configured to generate electric power using a fuel, the method comprising steps of:
acquiring composition-related information, the composition-related information being information other than the composition of the power generation material itself;
setting a control parameter for the composition-related information or the composition of the power generation material which is acquired from a table or a map which represents a correspondence between sets of composition-related information and control parameters of said fuel cell system which are predetermined based on the sets of composition of power generation materials or between sets of composition-related information and composition of power generation material which are predetermined based on the sets of power generation materials, in the fuel cell system; and
controlling an operation of the fuel cell system based on the set control parameter,
wherein said composition-related information is location information which identifies a location where the fuel cell system is installed.

3. A method for operating a fuel cell system including a fuel cell configured to generate electric power using a fuel, the method comprising steps of:
acquiring composition-related information, the composition-related information being information other than the composition of the power generation material;
setting a control parameter for the composition-related information or the composition of the power generation material which is acquired from a table or a map which represents a correspondence between sets of composition-related information and control parameters of said fuel cell system which are predetermined based on the sets of composition of power generation materials or between sets of composition-related information and composition of power generation material which are predetermined based on the sets of power generation materials, in the fuel cell system; and
controlling an operation of the fuel cell system based on the set control parameter,
wherein the composition-related information comprises location information which identifies location where the fuel cell system is installed, the location information comprises telephone numbers containing at least area codes.

4. The method of claim 1, wherein said control parameter relates to a supply amount of the water to a fuel processor included in the fuel cell system based on the composition-related information.

5. The method of claim 4, wherein the control parameters include a ratio of the supply amount of the water to said fuel processor to a supply amount of the power generation material to said fuel processor.

6. The method of claim 5, wherein said control parameter is set such that the number of water molecules in the water supplied to said fuel processor is 2 or more per 1 carbon atom in the power generation material supplied to said fuel processor.

7. The method of claim 1, wherein said control parameter is set for calculating a hydrogen amount in the fuel supplied to a fuel processor included in the fuel cell system based on the composition-related information.

8. The method of claim 7, further comprising controlling an amount of power generation such that an amount of hydrogen consumed by said fuel cell becomes equal to or less than the amount of hydrogen in the fuel calculated based on the control parameters set in said step of setting.

9. The method of claim 8, further comprising controlling the supply amount of the power generation material and a supply amount of the water such that the amount of hydrogen in the fuel calculated based on the control parameters set in said step of setting becomes equal to or greater than an amount of hydrogen consumed by said fuel cell.

10. The method of claim 1, wherein the fuel cell system further comprises a combustor to which a remaining fuel that has not been consumed by said fuel cell is supplied, and a combustion air supply device configured to supply air to said combustor, and
said control parameter includes a control parameter related to a supply amount of air to said combustor.

11. The method of claim 10, wherein said control parameter is set such that a ratio of a supply amount of combustion air to a theoretical air amount necessary for completely combusting a combustible gas in the remaining fuel discharged from said fuel cell becomes 1 or greater.

12. The method of claim 1, further comprising:
displaying the composition-related information on a display unit, wherein
in the step of acquiring composition-related information, specified composition-related information is selected from the composition-related information displayed on the display unit.

13. A method for operating a fuel cell system including a fuel cell configured to generate electric power using a fuel, the method comprising steps of:
acquiring composition-related information specifying time when the power generation material is supplied to the fuel cell system;
setting a control parameter for the composition-related information or the composition of the power generation material which is acquired from a table or a map which represents a correspondence between sets of composition-related information and control parameters of said fuel cell system which are predetermined based on the sets of composition of power generation materials or between sets of composition-related information and composition of power generation material which are predetermined based on the sets of power generation materials, in the fuel cell system; and
controlling an operation of the fuel cell system based on the set control parameter.

14. The method of claim 1, wherein the composition-related information is acquired via an external communication system that transmits the composition-related information.

15. The method of claim 1, wherein the correspondence of said composition-related information to the control parameters is a correspondence between the supply company and the control parameters.

16. The method of claim 2, wherein the correspondence of said composition-related information to the control parameters is a correspondence between material supply areas of the power generation materials that are the location information and the control parameters.

17. The method of claim 3, wherein the correspondence of said composition-related information to the control parameters is a correspondence between the control parameters and the telephone numbers corresponding to supply areas of the power generation material.

18. The method of claim 13, wherein the correspondence of said composition-related information to the control parameters is a correspondence between the time information and the control parameters.

19. The method of claim 1, wherein in the step of acquiring composition-related information, the composition-related information is acquired from outside via an external input/output terminal.

20. The method of claim 2, wherein said control parameter relates to a supply amount of the water to a fuel processor included in the fuel cell system based on the composition-related information.

21. The method of claim 20, wherein the control parameters include a ratio of the supply amount of the water to said fuel processor to a supply amount of the power generation material to said fuel processor.

22. The method of claim 21, wherein said control parameter is set such that the number of water molecules in the water supplied to said fuel processor is 2 or more per 1 carbon atom in the power generation material supplied to said fuel processor.

23. The method of claim 2, wherein said control parameter is set for calculating a hydrogen amount in the fuel supplied to a fuel processor included in the fuel cell system based on the composition-related information.

24. The method of claim 23, further comprising controlling an amount of power generation such that an amount of hydrogen consumed by said fuel cell becomes equal to or less than the amount of hydrogen in the fuel calculated based on the control parameters set in said step of setting.

25. The method of claim 24, further comprising controlling the supply amount of the power generation material and a supply amount of the water such that the amount of hydrogen in the fuel calculated based on the control parameters set in said step of setting becomes equal to or greater than an amount of hydrogen consumed by said fuel cell.

26. The method of claim 2, wherein the fuel cell system further comprises a combustor to which a remaining fuel that has not been consumed by said fuel cell is supplied, and a combustion air supply device configured to supply air to said combustor, and
said control parameter includes a control parameter related to a supply amount of air to said combustor.

27. The method of claim 26, wherein said control parameter is set such that a ratio of a supply amount of combustion air to a theoretical air amount necessary for completely combusting a combustible gas in the remaining fuel discharged from said fuel cell becomes 1 or greater.

28. The method of claim 2, further comprising:
displaying the composition-related information on a display unit, wherein in the step of acquiring composition-related information, specified composition-related information is selected from the composition-related information displayed on the display unit.

29. The method of claim 2, wherein the composition-related information is acquired via an external communication system that transmits the composition-related information.

30. The method of claim 2, wherein in the step of acquiring composition-related information, the composition-related information is acquired from outside via an external input/output terminal.

31. The method of claim 3, wherein said control parameter relates to a supply amount of the water to a fuel processor included in the fuel cell system based on the composition-related information.

32. The method of claim 31, wherein the control parameters include a ratio of the supply amount of the water to said fuel processor to a supply amount of the power generation material to said fuel processor.

33. The method of claim 32, wherein said control parameter is set such that the number of water molecules in the water supplied to said fuel processor is 2 or more per 1 carbon atom in the power generation material supplied to said fuel processor.

34. The method of claim 3, wherein said control parameter is set for calculating a hydrogen amount in the fuel supplied to a fuel processor included in the fuel cell system based on the composition-related information.

35. The method of claim 34, further comprising controlling an amount of power generation such that an amount of hydrogen consumed by said fuel cell becomes equal to or less than the amount of hydrogen in the fuel calculated based on the control parameters set in said step of setting.

36. The method of claim 35, further comprising controlling the supply amount of the power generation material and a supply amount of the water such that the amount of hydrogen in the fuel calculated based on the control parameters set in said step of setting becomes equal to or greater than an amount of hydrogen consumed by said fuel cell.

37. The method of claim 3, wherein the fuel cell system further comprises a combustor to which a remaining fuel that has not been consumed by said fuel cell is supplied, and a combustion air supply device configured to supply air to said combustor, and
said control parameter includes a control parameter related to a supply amount of air to said combustor.

38. The method of claim 37, wherein said control parameter is set such that a ratio of a supply amount of combustion air to a theoretical air amount necessary for completely combusting a combustible gas in the remaining fuel discharged from said fuel cell becomes 1 or greater.

39. The method of claim 3, further comprising:
displaying the composition-related information on a display unit, wherein in the step of acquiring composition-related information, specified composition-related information is selected from the composition-related information displayed on the display unit.

40. The method of claim 3, wherein the composition-related information is acquired via an external communication system that transmits the composition-related information.

41. The method of claim 3, wherein in the step of acquiring composition-related information, the composition-related information is acquired from outside via an external input/output terminal.

42. The method of claim 13, wherein said control parameter relates to a supply amount of the water to a fuel processor included in the fuel cell system based on the composition-related information.

43. The method of claim 42, wherein the control parameters include a ratio of the supply amount of the water to said fuel processor to a supply amount of the power generation material to said fuel processor.

44. The method of claim 43 wherein said control parameter is set such that the number of water molecules in the water supplied to said fuel processor is 2 or more per 1 carbon atom in the power generation material supplied to said fuel processor.

45. The method of claim 13, wherein said control parameter is set for calculating a hydrogen amount in the fuel supplied to a fuel processor included in the fuel cell system based on the composition-related information.

46. The method of claim 45, further comprising controlling an amount of power generation such that an amount of hydrogen consumed by said fuel cell becomes equal to or less than the amount of hydrogen in the fuel calculated based on the control parameters set in said step of setting.

47. The method of claim 46, further comprising controlling the supply amount of the power generation material and a supply amount of the water such that the amount of hydrogen in the fuel calculated based on the control parameters set in said step of setting becomes equal to or greater than an amount of hydrogen consumed by said fuel cell.

48. The method of claim 13, wherein the fuel cell system further comprises a combustor to which a remaining fuel that has not been consumed by said fuel cell is supplied, and a combustion air supply device configured to supply air to said combustor, and said control parameter includes a control parameter related to a supply amount of air to said combustor.

49. The method of claim 48, wherein said control parameter is set such that a ratio of a supply amount of combustion air to a theoretical air amount necessary for completely combusting a combustible gas in the remaining fuel discharged from said fuel cell becomes 1 or greater.

50. The method of claim 13 further comprising:

displaying the composition-related information on a display unit, wherein in the step of acquiring composition-related information, specified composition-related information is selected from the composition-related information displayed on the display unit.

51. The method of claim 13, wherein the composition-related information is acquired via an external communication system that transmits the composition-related information.

52. The method of claim 13, wherein in the step of acquiring composition-related information, the composition-related information is acquired from outside via an external input/output terminal.

* * * * *